US006917802B1

(12) United States Patent
Nilsson

(10) Patent No.: US 6,917,802 B1
(45) Date of Patent: *Jul. 12, 2005

(54) MOBILE KEYLESS TELEPHONE INSTRUMENTS AND WIRELESS TELECOMMUNICATIONS SYSTEM HAVING VOICE DIALING AND VOICE PROGRAMMING CAPABILITIES

(76) Inventor: Byard G. Nilsson, 2064 Santa Margarita Dr., Fallbrook, CA (US) 92028

( * ) Notice: Subject to any disclaimer, the term of this patent is extended or adjusted under 35 U.S.C. 154(b) by 514 days.

This patent is subject to a terminal disclaimer.

(21) Appl. No.: 09/860,992

(22) Filed: May 17, 2001

Related U.S. Application Data

(63) Continuation-in-part of application No. 09/226,178, filed on Jan. 4, 1999, now Pat. No. 6,308,053, which is a continuation-in-part of application No. 08/955,338, filed on Oct. 21, 1997, now Pat. No. 6,298,250, which is a continuation-in-part of application No. 08/878,864, filed on Jun. 19, 1997, now Pat. No. 6,049,710.

(51) Int. Cl.[7] .............................. H04M 3/00; H04M 1/64
(52) U.S. Cl. .................... 455/419; 455/563; 379/88.03; 704/275
(58) Field of Search ................................. 455/405, 406, 455/407, 408, 409, 569.1, 567, 563, 418, 419, 403, 410, 411; 379/88.01, 88.02, 88.03, 88.04; 704/231, 246, 275

(56) References Cited

U.S. PATENT DOCUMENTS

| 3,688,126 A | 8/1972 | Klein | 307/116 |
|---|---|---|---|
| 4,007,364 A | 2/1977 | Ojima et al. | 708/107 |
| 4,320,256 A | 3/1982 | Freeman | 379/73 |
| 4,475,189 A | 10/1984 | Herr et al. | 370/261 |
| 4,596,900 A | 6/1986 | Jackson | 379/102.02 |

(Continued)

FOREIGN PATENT DOCUMENTS

| WO | 96/03001 | 2/1996 | H04M/17/00 |
|---|---|---|---|
| WO | 99/14928 | 3/1999 | H04M/3/50 |

OTHER PUBLICATIONS

Business Communications Review, Jan.–Feb. 1981, Dorros, pp. 4–11.
GLOBECOM '82 Conference Record, vol. 2 of 8, "A New Protocal for Call Handling Functions for the SPC Network," Gawrys, et al., IEEE Catalog No. 82CH1819–2, pp. 735–738.

Primary Examiner—Rafael Perez-Gutierrez

(57) ABSTRACT

A telecommunication system incorporates individual station instruments simplified by wireless operation, voice dialing, prepaid and custom-programmed operating characteristics, all enabled by cooperative operation with supporting central equipment. Wireless operation of the central equipment involves a multiple port wireless platform along with other units for interfacing a multitude of mobile station instruments simultaneously for interactive audio communication to: program the operating characteristics as with respect to language, out call, anti-fraud and available data, as well as to regulate, control, monitor and record operations of the instruments, and bridge communication with selected remote terminals through the public switched telephone network. Message capability, rapid dialing, emergency abort to an operator station and security features supplement the basic system.

41 Claims, 11 Drawing Sheets

U.S. PATENT DOCUMENTS

| | | | |
|---|---|---|---|
| 4,611,094 A | 9/1986 | Asmuth | 379/201.03 |
| 4,731,811 A | 3/1988 | Dubus | 455/563 |
| 4,829,514 A | 5/1989 | Frimmel | 370/368 |
| 4,856,066 A | 8/1989 | Lemelson | 704/275 |
| 4,870,686 A | 9/1989 | Gerson et al. | 379/355.09 |
| 4,879,744 A | 11/1989 | Tasaki et al. | 379/144.01 |
| 4,969,180 A | 11/1990 | Watterson et al. | 455/555 |
| 5,042,063 A | 8/1991 | Sakanishi et al. | 379/88.02 |
| 5,153,902 A | 10/1992 | Buhl et al. | 455/432.1 |
| 5,195,090 A | 3/1993 | Bolliger et al. | 370/314 |
| 5,203,009 A | 4/1993 | Bogusz et al. | 455/33.1 |
| 5,222,121 A | 6/1993 | Shimada | 379/88.03 |
| 5,274,695 A | 12/1993 | Green | 379/88.02 |
| 5,297,183 A | 3/1994 | Bareis et al. | 455/410 |
| 5,297,194 A | 3/1994 | Hunt et al. | 379/88.02 |
| 5,353,335 A | 10/1994 | D'Urso et al. | 379/114.2 |
| 5,353,336 A | 10/1994 | Hou et al. | 379/88.02 |
| 5,369,685 A | 11/1994 | Kero | 379/88.04 |
| 5,377,256 A | 12/1994 | Franklin et al. | 455/404.1 |
| 5,420,912 A | 5/1995 | Kopp | 379/88.07 |
| 5,440,620 A | 8/1995 | Slusky | 379/100.07 |
| 5,450,479 A | 9/1995 | Alesio et al. | 379/142.01 |
| 5,461,664 A | 10/1995 | Cappadona | 455/572 |
| 5,485,505 A | 1/1996 | Norman et al. | 455/419 |
| 5,499,288 A | 3/1996 | Hunt et al. | 379/88.02 |
| 5,509,049 A | 4/1996 | Peterson | 455/563 |
| 5,509,060 A | 4/1996 | Hall et al. | 379/207.02 |
| 5,541,977 A | 7/1996 | Hodges et al. | 455/411 |
| 5,574,771 A | 11/1996 | Driessen et al. | 455/413 |
| 5,592,535 A | 1/1997 | Klotz | 455/406 |
| 5,599,204 A | 2/1997 | Glassford | 439/502 |
| 5,602,900 A | 2/1997 | Hattori | 455/566 |
| 5,640,689 A | 6/1997 | Rossi | 455/575.7 |
| 5,659,597 A | 8/1997 | Bareis | 455/563 |
| 5,710,813 A | 1/1998 | Terui | 380/275 |
| 5,719,926 A | 2/1998 | Hill | 379/197 |
| 5,754,645 A | 5/1998 | Metroka et al. | 455/550.1 |
| 5,778,313 A | 7/1998 | Fougnies | 455/406 |
| 5,790,636 A | 8/1998 | Marshall | 379/88.19 |
| 5,797,101 A | 8/1998 | Osmani et al. | 455/551 |
| 5,802,466 A | 9/1998 | Gallant | 455/413 |
| 5,812,945 A | 9/1998 | Hansen et al. | 455/403 |
| 5,815,807 A | 9/1998 | Osmani et al. | 455/410 |
| 5,818,915 A | 10/1998 | Hayes, Jr. et al. | 455/405 |
| 5,826,185 A | 10/1998 | Wise | 455/405 |
| 5,828,738 A | 10/1998 | Spaeth | 379/130 |
| 5,832,371 A | 11/1998 | Thornton | 455/575.1 |
| 5,835,570 A | 11/1998 | Wattenbarger | 379/88.03 |
| 5,839,058 A | 11/1998 | Phillips et al. | 455/409 |
| 5,845,218 A | 12/1998 | Altschul | 455/565 |
| 5,850,599 A | 12/1998 | Seiderman | 455/406 |
| 5,854,975 A | 12/1998 | Fougnies | 455/408 |
| 5,867,796 A | 2/1999 | Inutsuka | 455/567 |
| 5,870,459 A | 2/1999 | Phillips et al. | 455/409 |
| 5,884,188 A | 3/1999 | Hayes | 455/552.1 |
| 5,946,613 A | 8/1999 | Hayes, Jr. et al. | 455/406 |
| 5,963,859 A | 10/1999 | Keating | 455/405 |
| 5,966,654 A | 10/1999 | Croughwell et al. | 455/414.1 |
| 5,995,926 A | 11/1999 | Gupta et al. | 704/240 |
| 6,049,710 A | 4/2000 | Nilsson | 455/409 |
| 6,085,080 A | 7/2000 | Rahikainen et al. | 455/403 |
| 6,138,036 A | 10/2000 | O'Cinneide | 455/557 |
| 6,149,353 A | 11/2000 | Nilsson | 455/409 |
| 6,154,526 A | 11/2000 | Dahlke et al. | 379/88.03 |
| 6,157,848 A | 12/2000 | Bareis et al. | 455/563 |
| 6,167,118 A | 12/2000 | Slivensky | 379/88.03 |
| 6,167,251 A | 12/2000 | Segal et al. | 455/406 |
| 6,198,947 B1 | 3/2001 | Barber | 379/88.02 |
| 6,226,532 B1 | 5/2001 | Kim et al. | 455/563 |
| 6,292,675 B1 | 9/2001 | Nilsson | 455/563 |
| 6,298,250 B1 | 10/2001 | Nilsson | 455/569.1 |
| 6,308,053 B1 | 10/2001 | Nilsson | 455/575.1 |
| 6,393,304 B1 | 5/2002 | Meche | 379/355.02 |
| 6,400,967 B1 * | 6/2002 | Nilsson | 455/563 |
| 6,405,029 B1 | 6/2002 | Nilsson | 455/409 |
| 6,418,328 B1 | 7/2002 | Shon | 379/355.09 |
| 6,473,610 B1 * | 10/2002 | Nilsson | 455/406 |
| 6,580,927 B1 * | 6/2003 | Nilsson | 455/563 |
| 6,584,327 B1 * | 6/2003 | Nilsson | 455/563 |
| 6,647,255 B1 * | 11/2003 | Nilsson | 455/563 |
| 6,751,482 B1 * | 6/2004 | Nilsson | 455/564 |
| 6,754,481 B1 * | 6/2004 | Nilsson | 455/563 |
| 6,845,234 B1 * | 1/2005 | Nilsson | 455/563 |

* cited by examiner

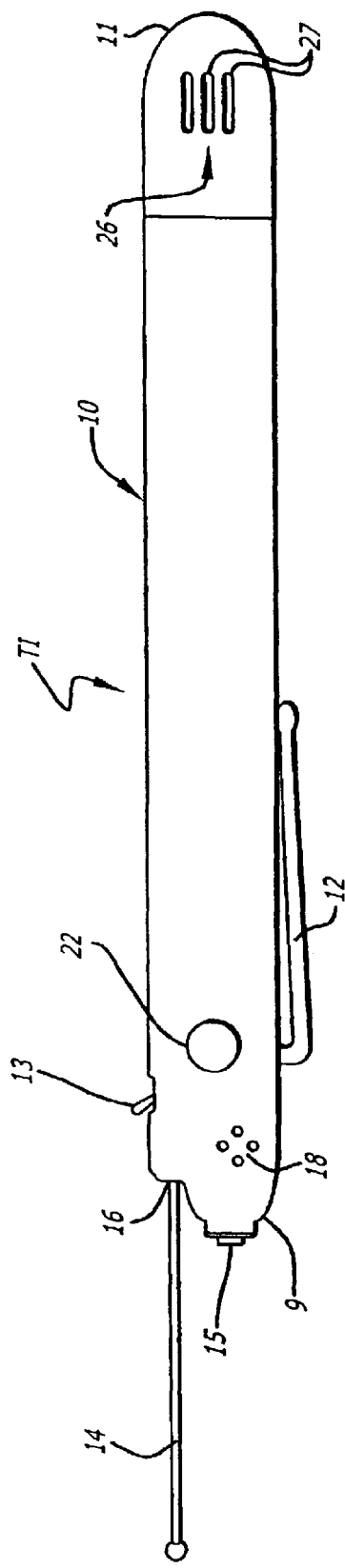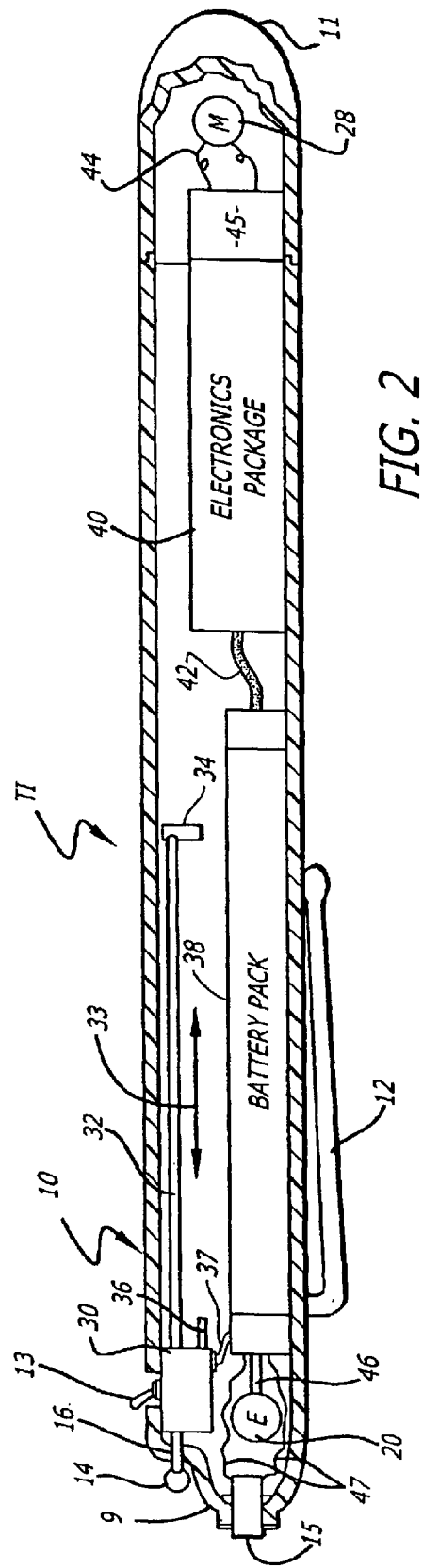

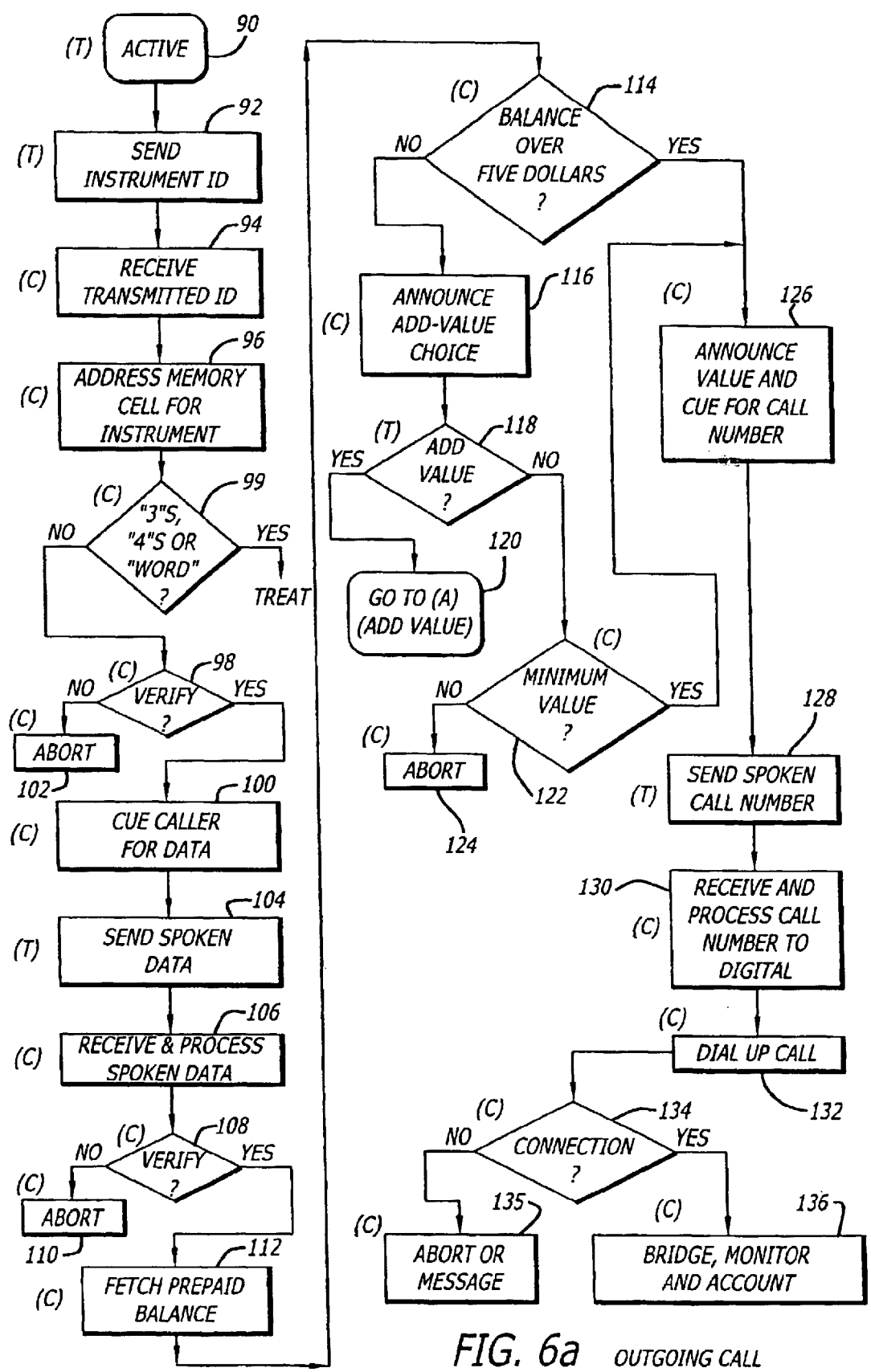
FIG. 6a   OUTGOING CALL

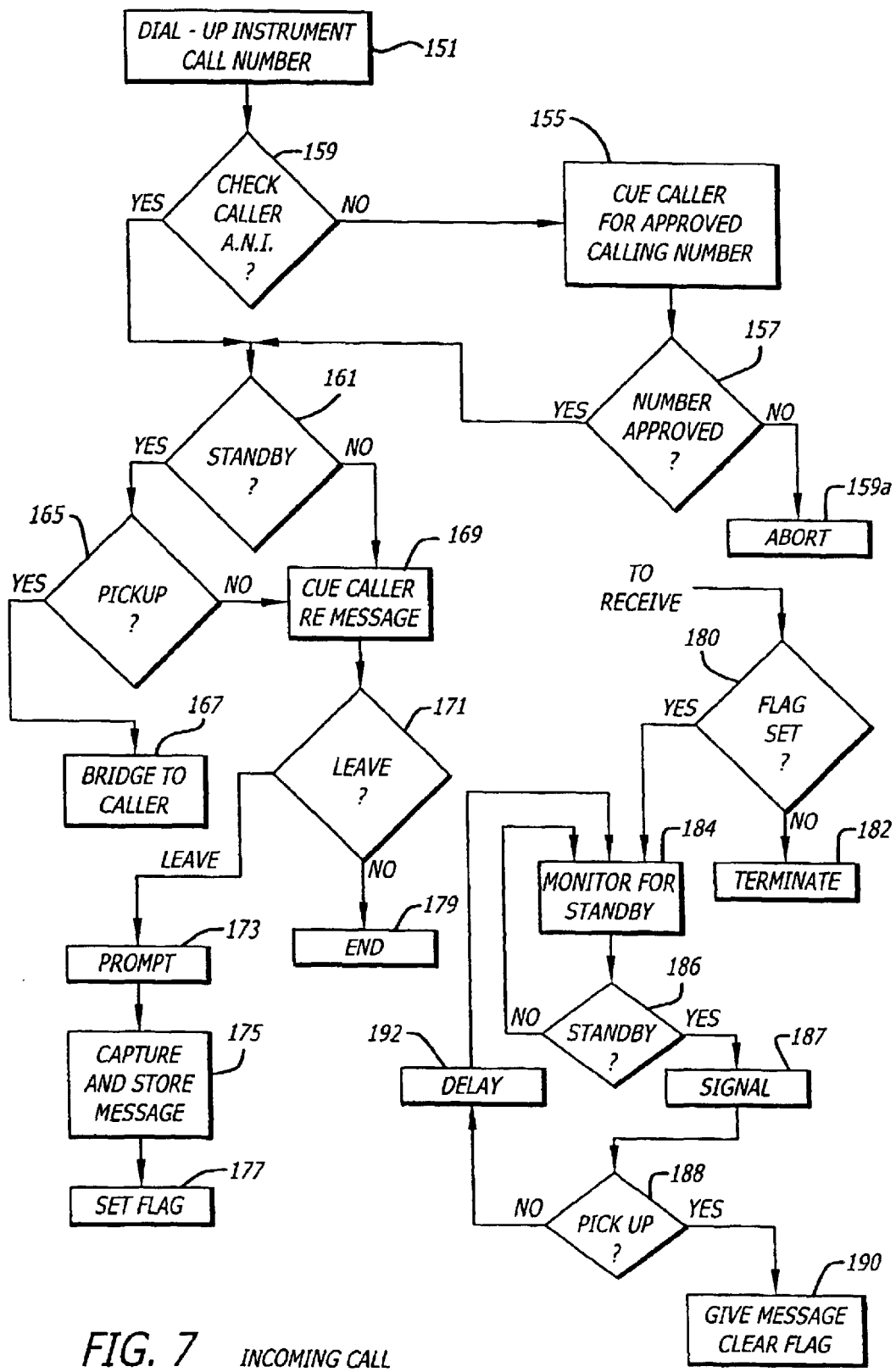
FIG. 7   INCOMING CALL

MOBILE KEYLESS TELEPHONE INSTRUMENTS AND WIRELESS TELECOMMUNICATIONS SYSTEM HAVING VOICE DIALING AND VOICE PROGRAMMING CAPABILITIES

RELATED APPLICATION INFORMATION

This is a continuation-in-part of a prior patent applications entitled "Recyclable Wireless Telephone Unit With a Secured Activation Switch (As Amended)," filed Jan. 4, 1999 and assigned Ser. No. 09/226,178 now U.S. Pat. No. 6,308,053, which is a continuation in part of a prior patent application entitled "Wireless Prepaid Telephone System with Extended Capability" filed Oct. 21, 1997 and assigned Ser. No. 08/955,338 now U.S. Pat. No. 6,298,250 which is a continuation-in-part of a prior patent application entitled "Wireless Prepaid Telephone System With Dispensable Instruments" filed Jun. 19, 1997 and assigned Ser. No. 08/878,864 now U.S. Pat. No. 6,049,710, each of which is hereby incorporated by reference as if set forth fully herein.

BACKGROUND OF THE INVENTION (1) Field of the Invention:

The present invention relates to mobile telecommunication and more specifically to wireless telephone systems including telephone instruments capable of being programmed for specific use, as well as being compact, inexpensive and simple, all as a result of operation in combination with enhanced central station equipment.

(2) Background and Description:

In recent years, considerable progress has been made in the field of wireless or mobile telephone instruments and systems. In that regard, wireless telephone instruments, sometimes called "mobile stations" (MS) have come into widespread use, accommodated, for example, by geographically defined cells and other equipment. Although the improved instruments and systems are quite effective, and have considerably enhanced telephonic communication, needs for improvement continue to exist.

Typically in wireless systems, individual telephone instruments communicate at an initial level with central equipment, sometimes called "base stations" (BS). Operating with other components as a composite system, the geographically-separate base stations enable mobile telephone instruments to roam through different geographic areas or cells. Thus, from various locations, mobile instruments may be able to access virtually any telephone terminal throughout an entire dial-up telephone network, sometimes called the "public switched telephone network" (PSTN), and in the course of a call roam freely from one cell to another.

Traditionally, a composite mobile telecommunications system includes some form of a switching system, sometimes including a unit called a "mobile switching center" (MSC). The MSC may be provided, along with other structure between a base station (BS) and the public switched telephone network (PSTN). Accordingly, conventional mobile management is accomplished using various well known techniques and structures. However, note that radical system changes are in progress to expand and improve the systems.

In traditional systems, individual wireless telephone instruments typically are purchased by users in a transaction that is rather complex. As part of the purchase transaction, the instrument is activated and numbers are assigned. Also, a financial commitment is established for the new owner. Of course, the owner is responsible for the telephone instrument itself, however, responsibility also extends to the telephone service provided for the instrument, e. g. calls charged to the instrument.

Generally, wireless instruments are quite susceptible to loss or theft and they inherently involve an increased exposure resulting from illicit use. While adjustments may be made in the billing for illicit calls, usually such adjustments are not made without the expense of time and aggravation to instrument owner. Thus, the risk of physical loss with the attendant threat of unauthorized use presents a nagging annoyance to wireless instrument owners.

Concern over the risk of losing a wireless telephone instrument is compounded by the fact that routine wireless operation exposes critical information (as by radio link) that can be obtained without physical access to a telephone instrument. When obtained, such information can be used to charge fraudulent calls to a wireless owner's account. Consequently, even when an instrument never leaves an owners control, the owner may be invoiced for calls fraudulently made from a cloned instrument. Thus, a need exists for more limited risk.

Another consideration involves the potential for extending the useful life of wireless telephone instruments, particularly in the form of small, inexpensive instruments that are simple to acquire, use and recycle.

Furthermore, a need exists to accommodate the desires of individual wireless telephone users to a greater extent. Specifically, the present developments are based, to some extent, on recognizing the benefits of providing individual operating features and characteristics for individual telephone instruments that can be simply and easily implemented.

SUMMARY OF THE INVENTION

To some extent, the present invention is based on recognizing certain distinct aspects of wireless telephones. The very nature of wireless telephone instruments renders them more susceptible to misplacement, loss and theft. Also, wireless telephone instruments tend to be more personal. That is, a large fraction of these instruments are used almost exclusively by only one, or at most two persons. Consequently, in accordance herewith, during preliminary operation, instruments can be effectively customized, as for example, with specific features, operations and interfaces, as with language or voice as in a keyless embodiment.

Furthermore, in part, the present invention is based on recognizing that a simple wireless telephone instrument can be programmed for extended and customized use by operating such instruments cooperatively with a central system that performs a wide variety of functions.

Generally, after programming during the preliminary operation, in accordance with the disclosed embodiments hereof, customized, convenient, inexpensive, voice-actuated, prepaid, keyless and wireless telephone instruments are enabled, that accomplish telephonic transactions during dial-up operation and involve limited complications, along with limited risk and exposure for owners while enabling various telephonic transactions, as expanded communication capabilities and features. For example, customized language or voice recognition, incoming call options, expanded message formats, call selectivity, screening and routing operations all are made available along with locator and tracking capabilities. Furthermore, by central station processing in accordance herewith, capabilities may be incorporated to easily and effectively accomplish telephonic transactions communications as in cases of emergency or for control. Certain aspects of communication, as relating to fraud control, also can be restricted to a single user of an instrument.

Basically, in accordance with the present invention a wireless telephone instrument consists essentially of an earphone, a microphone, a radio transceiver, a battery pack and a control unit (with memory, switching and signaling capabilities) all embodied in a small convenient housing.

As disclosed herein, the present wireless telephone instruments operate as part of a composite system in cooperation with a central station having a multiple-port platform. The ports of the platform accommodate multiple wireless (and other) telephone instruments simultaneously, to variously access any of a variety of programmed operations and ultimately other services or remote terminals.

In a disclosed keyless embodiment, for outgoing calls, the users of wireless telephone instruments are signaled as by being prompted vocally, to speak numerical control words as well as message words. For example, voice or spoken words may accomplish programming, routing or control signals as well as audio communication. Thus, telephonic transactions, as communication by users of the wireless telephone instruments as disclosed herein, is accomplished by input in the form of voice signals generated from the user's voice and variously interpreted and used at the central station depending on form and conditions.

At a central station, certain numerical voice signals are recognized as digits, e. g. digits "zero" through "nine", by a voice recognition unit and consequently are converted to a dialing form (DTMF or digital) for programing, control, dial-up or routing functions. Words also may be assigned for indicating the telephone star (or asterisk "*") and the pound sign ("#") signals as they are generated using a traditional telephone keypad. By customizing operations, single non-numerical words, e. g. "home" also may be recognized to command a specific called number. Other words, as spoken by authorized users, may serve to verify proper use.

Essentially, the central-station system, in addition to a platform, may include a voice generator, e. g. an audio response unit (ARU), a voice recognition unit, e. g. minimally with "number" or numerical word recognition capability, and a control unit operating with a memory as for storing prepaid values and instrument data, all effectively coupled to accommodate outgoing (and possibly incoming) communications that include various message forms as well as vocal communication.

Essentially, with the sale or other transfer of an instrument (as disclosed) to a proper user, an interface is established during a preliminary operation to program the operation of the instrument individually, according to data at the central-station system. Various customized features and operations are available. For example, instruments may be afforded a selection of languages for prompts and instructions. Voice recognition may be customized. Incoming calls may be a selected option, as may be various controls, limitations and related operations. Thus, a user is afforded a variety of operating characteristics and functions to thereby customize an instrument for personal use based on centrally stored data.

In accordance with the dial-up operations of one embodiment of the present invention, a central-station platform interfaces individual remote wireless telephone instruments as well as traditional telephone terminals to accomplish various communication objectives. Voice cues or sound signals prompt the users of wireless instruments to provide vocalized numerals (audio) that are received, as in combinations, and may be acknowledged to indicate various desired objectives. As indicated above, custom interfaces involving words or voice may be selected and executed, as well as various other controls. Dial-up or routing signals accordingly may be generated to accomplish: a desired terminal connection, identification, authentication or verification.

Generally, if a call is determined to be proper, the central station determines whether the instrument has adequate pre-paid value to cover the call. If so, the indicated communication may be completed through the associated mobile network and a public network (PSTN). If charges are levied on the call, they are reflected in the instrument's prepaid balance.

With reference to current technology, certain known elements of existing central stations may be variously embodied in a mobile network hereof, as by supplementing and modifying a base station and/or mobile switch center. Accordingly, the system hereof may be variously incorporated in traditional or future wireless telecommunications systems to accommodate various features and improvements hereof.

The basic simplicity of instruments in accordance herewith enable very compact telephone instrument forms, as in the configuration of a hand-held fountain pen, e.g., simply an elongated cylinder of less than one inch diameter. In large production runs, individual instruments may be quite inexpensive, even to the extent of being discardable or disposable when the original pre-paid value has been consumed. However, in accordance herewith, individual instruments, along with their enabling system may be implemented to facilitate extended use. For example, as a result of aspects hereof, individual instruments may be effectively reactivated or recycled to extend their useful life.

In summary, in accordance herewith, customized, convenient, economical, inexpensive and effective instruments may be distributed with defined and relatively small risk, as in the event of loss. Complications and obligations of ownership also may be relatively few.

BRIEF DESCRIPTION OF THE DRAWINGS

In the drawings, which constitute a part of this specification, exemplary embodiments of the invention are set forth as follows:

FIG. 1 is a side view showing a wireless mobile telephone instrument in accordance with the present invention;

FIG. 2 is a sectional view taken lengthwise through the instrument as shown in FIG. 1;

FIGS. 6a and 6b are related flow charts detailing further operations of the system as depicted in FIG. 3;

FIG. 7 is a flow chart detailing still another operation of the system of FIG. 3;

DESCRIPTION OF THE PREFERRED EMBODIMENT

Figure 3:
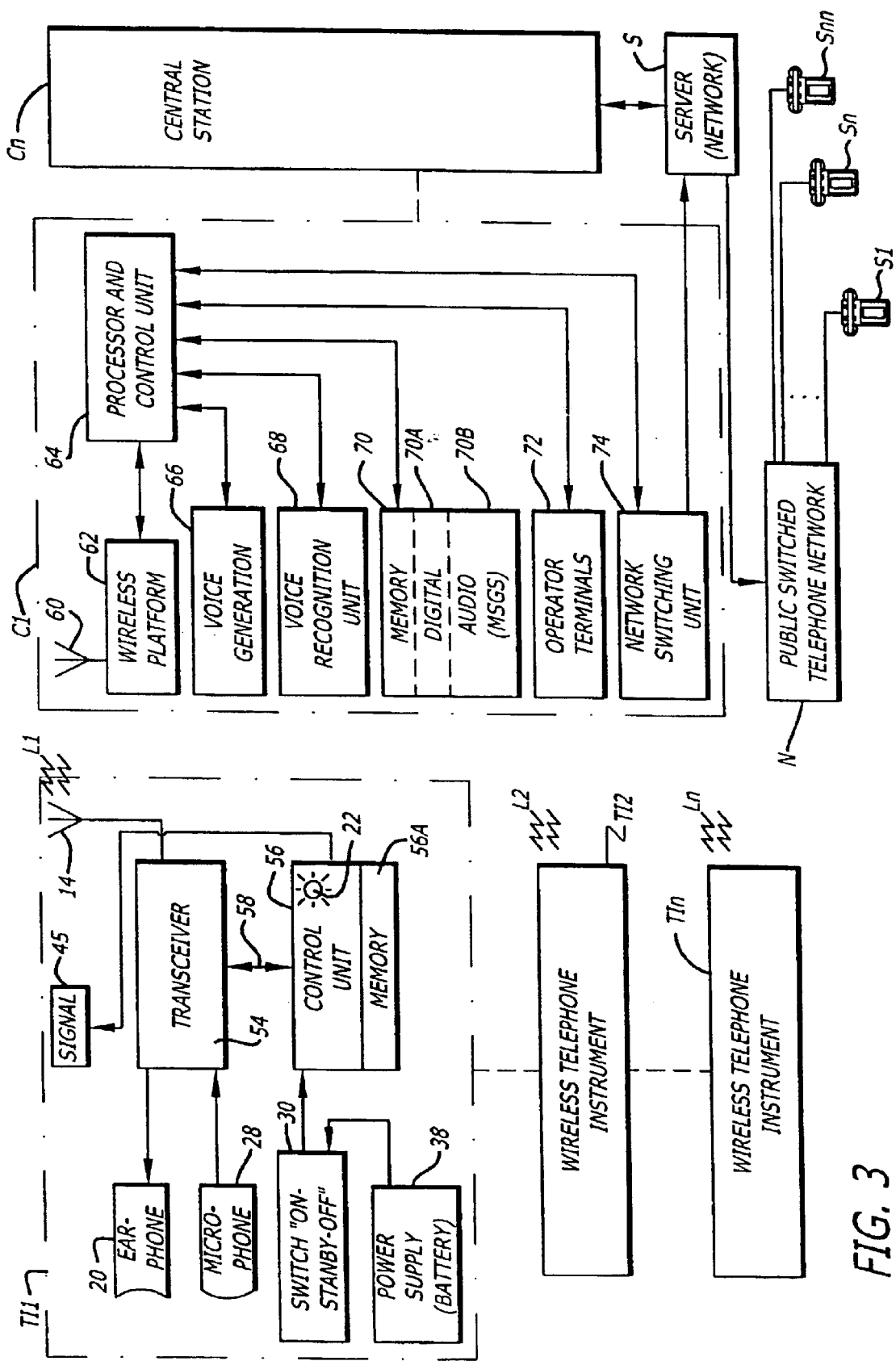
FIG. 3 is a block diagram of a system in accordance with the present invention, showing the telephone instruments and central station components for use with a public switched telephone network.

As indicated above, detailed embodiments of the present invention are disclosed herein. However, the embodiments are merely representative, recognizing that a wide variety of alternative embodiments are possible utilizing a multitude of different techniques and components that may be variously distributed and located. Nevertheless, the disclosed embodiments are deemed to afford the best embodiments for purposes of disclosure and to provide a basis for the claims herein which define the scope of the present invention.

As indicated, parents to this case are U.S. Ser. Nos. 08/955,338, 08/878,864 and 09/226,178 which describe related embodiments and which are incorporated by reference herein.

Referring initially to FIG. 1, a mobile station, or wireless telephone instrument TI is depicted showing some exterior components. Specifically, the instrument TI is embodied in a tubular housing 10 with somewhat hemispherical ends 9 (left) and 11 (right) to define a hand held configuration that is somewhat similar to that of a writing instrument, e. g. a fountain pen.

Near the end 9 of the housing 10, a pocket clip 12 is affixed to extend parallel to the central axis of the housing 10. The clip 12 may serve as a handle and accommodates convenient attachment of the instrument TI during storage. Note that the pocket clip 12 may be variously placed radially to attain the most universally convenient location for use as a handle. Note also that the instrument TI is keyless, that is, it has no traditional telephone keypad.

Also apparent from the exterior of the instrument TI is an antenna 14 (FIG. 1, upper left) which is telescopically mounted either to be substantially contained in the housing 10 or to extend through a port 16, so that its major length is outside the housing 10. Note that in FIG. 1, the antenna 14 is shown partially extended from the housing 10 while in FIG. 2, it is shown retracted.

Near the antenna 14 is a manual on-off switch 13 which functions in conjunction with the structure of the antenna 14 to set each of four possible states for the instrument TI, specifically: "active", "standby" "pager" or "off" as described in detail below.

Also, near the antenna port 16 (FIG. 1) at the very tip of the end 9, is a receptacle 15 for a jack (not shown) to recharge the instrument. Somewhat adjacent the receptacle 15, an array of small openings 18 penetrate the housing 10 for passing sound from an earphone 20 (FIG. 2, top).

Mounted near the array of openings 18 is a pilot lamp 22 to indicate the position of the switch 13, and which is illuminated during the states "active" and "pager". The individual states are further indicated by the position of the antenna 14. Thus, a switching structure for setting the four states involve the antenna 14 and the switch 13, as described below with reference to FIG. 2.

Near the end 11 (FIG. 1, right) a group 26 of slots 27 penetrate the housing for passing a users voice sounds to a microphone 28 (FIG. 2, bottom). Thus, the instrument TI is configured to position the microphone 28 near a user's mouth while the earphone 20 is positioned near the user's ear. The elemental simplicity and convenience of the instrument TI are apparent, both for storage and use.

The earphone 20 (FIG. 2) and the microphone 28, mentioned above, are firmly fixed within the housing 10. Also fixed in the housing 10 is a switch device 30 (upper left) configured as a small block. The switch device 30 supports both the antenna 14 and the switch 13. It is involved in setting the state of the instrument TI. Structurally, the switch device 30 defines a small bore (not shown) that telescopically receives an elongate shaft 32 of the antenna 14. Accordingly, the switch device 30 provides a slide bearing to accommodate axial movement of the antenna 14 as indicated by an arrow 33.

When the antenna 14 is withdrawn to extend fully from the unit 10, a knob 34, located at the inner end of the antenna shaft 32 (right), engages a spring-biased plunger 36 extending from the switch device 30. The knob 34 forces the plunger 36 telescopically within the switch device 30. Note that forms of plunger switch devices, as embodied in the antenna switch box 30, are well known and widely used. In that regard, retraction of the antenna 14 releases the spring-biased plunger 36 allowing it to return to the exposed position (off) as illustrated (FIG. 2).

In operation, control logic embodied in the switch box 30 decodes the two binary positions of the members (switch 13 and antenna 14, FIG. 2) to set the four individual states. Specifically, if programmed for use, the operational states of the instrument TI are as follows:

| STATE | DESIGNATION | SWITCHING |
|---|---|---|
| "off" | CA | antenna 14 in, switch 13 "off" (no operations) |
| "pager" | CB | antenna 14 in, switch 13 "on" (traditional pager operation) |
| "stdby" | CD | antenna 14 out, switch 13 "off" (receive incoming calls) |
| "active" | CE | antenna 14 out, switch 13 "on" (outgoing call mode or call in progress) |

The states CB, CE and CD are indicated by similarly designated binary signals provided by a simple truth-table decoder (not shown) and are transmitted to a central station for control use. Note that the "off" state CA coincides to a "no signal" state.

The instrument components are electrically interconnected to accomplish operations as described in detail below. Specifically, the switch box 30 is coupled by a cable 37 through a battery pack 38 to an electronics package 40. A tone signal or buzzer 45 in the package 40 commands attention. Connections from the electronics package 40 also extend through a cable 42 to a battery pack 38, the microphone 28 (wires 44) and to the earphone 20 (wires 46). The battery pack 38 also is connected to the charging receptacle 15 by wires 47. The electronics package 40 may comprise an integrated circuit chip (not separately shown) constituting the component electronic parts to operate as described below.

To preliminarily consider the distribution and use of the instrument, a purchaser might take delivery with only minimal formality. A prepaid amount would be paid and recorded. The programming either can be minimal or rather extensive; however, it may be accomplished by a central-station interface requiring only a short time. Instruments may well be configured and sold such that programming is performed by a sales person or by the purchaser. Essentially, after verifying that the instrument is activated, the sales person or user (or owner) has the opportunity to customize the instrument. As treated in detail below, the user may program an instrument TI to establish specific operations and functions. Any of the following exemplary functions and operations may customize an instrument TI and are explained in greater detail below.

| | |
|---|---|
| PIN: | choose a desired PIN, or operation without PIN verification |
| LANGUAGE AND/ OR VOICE: | choose choice of language or voice recognition for interface operation |
| INCOMING CALLS: | choose to receive or not receive incoming calls |
| LIMIT CALLS: | limit incoming calls to specific calling numbers |
| MESSAGES: | take message on incoming calls |
| PAGER: | choose or reject pager operation |
| OUTGOING LIMITS: | choose to limit outgoing calls to specific area codes |
| WORD DIALING: | choose and assign word dialing |
| LOCATION REPORTS: | enable location reports |

Additionally, though not required, various other owner or user data may be prompted, received and stored.

After the programming is completed, at least for basic dial-up operation of the instrument TI, a user simply withdraws the antenna 14 and flips "on" the switch 13 (setting the "active" state C4). With the earphone 20 near the users ear, audible prompts or cues soon are heard instructing the user to respond with spoken-word operating instructions as by speaking digits of a called number. After such audio communication with the central station, a communication link is completed from the instrument TI to a desired remote telephone terminal.

Before considering other operating aspects of the system, it will be useful to treat structural details as disclosed in FIG. 3. In that regard, note that the disclosed instruments and system accommodate various operations and functions to be programmed for individual instrunents. However, instruments and systems of lesser capability may be used as disclosed in related cases with more limited capability, still programmed in accordance herewith. For example, in one instrument embodiment, the programmed option of incoming calls may not be offered.

Turning now to FIG. 3, a plurality of individual wireless telephone instruments TI1 through TIn are represented (FIG. 3, left). For example, the instruments TI1–TIn may take the physical form of the instrument TI as described with reference to FIGS. 1 and 2 and as represented in block form in FIG. 3.

The wireless instruments TI1–TIn interface a public switched telephone network N (FIG. 3, lower center) through central, wireless stations C1–Cn and a server S. Of course, the public switched telephone network N also is coupled to (or includes) a multitude of other telephone terminals as symbolically represented by terminals S1 through Sn. As known in the art, any of a wide variety of techniques and structures can be utilized to selectively accomplish the connective functions through a wireless network and a public network to the terminals S1–In.

The stations C1 through Cn function in cooperation with the instruments TI1 through TIn. For example, the stations C1–Cn may serve as base radio stations for different geographic areas and may be managed by the server S to accommodate roaming by the instruments TI1–TIn as well known in the art. Details of the wireless management and server functions also are well known and consequently are not treated here in any detail. However, note that the server S may be replicated and that various of the wireless and conventional telephone functions may be performed either by the central stations C1–Cn or in the server S, depending on specific system architecture and design criteria.

Figure 4:
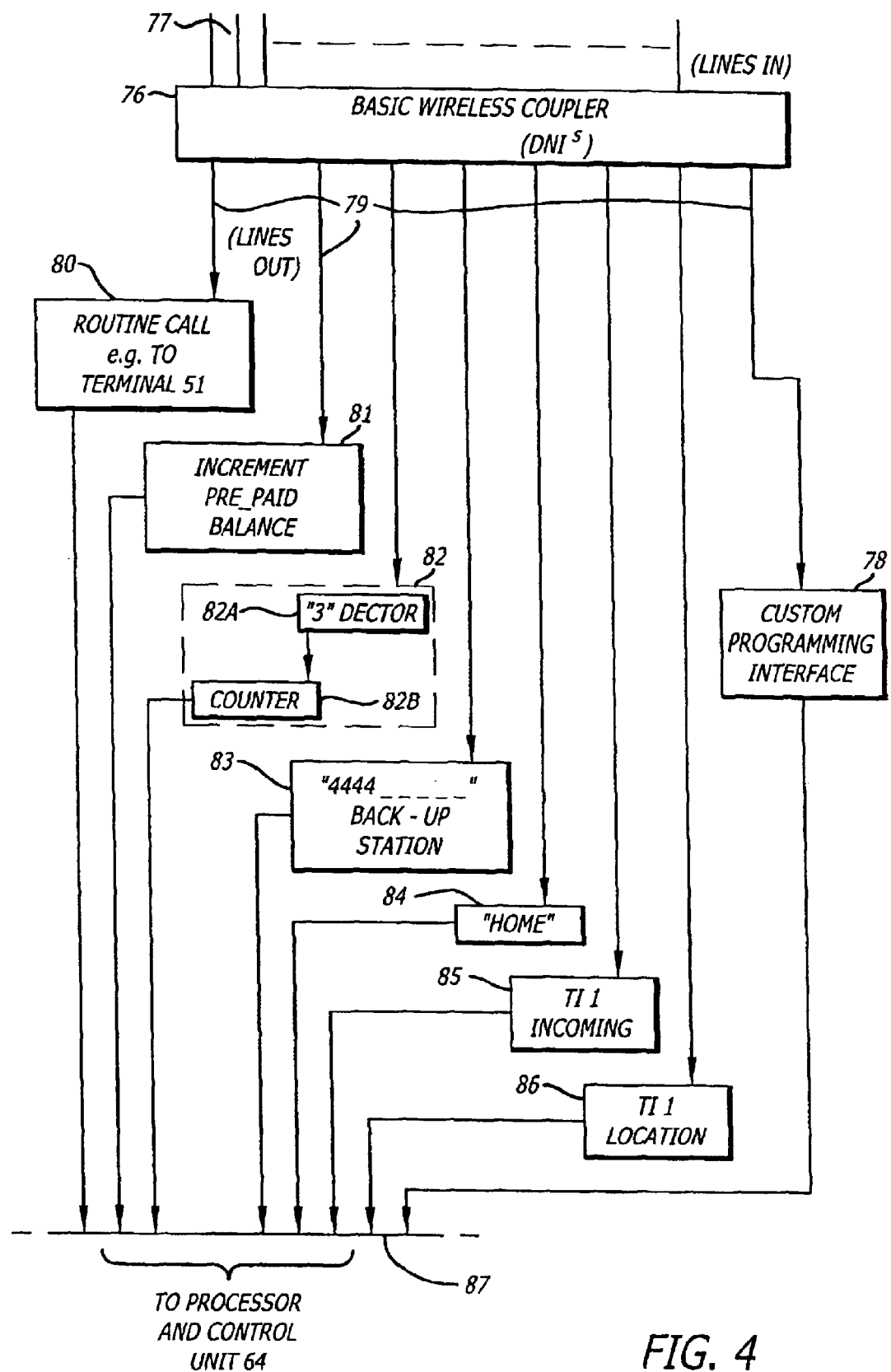
FIG. 4 is a block diagram of a component of the system of FIG. 3.

Generally, some aspects of the system of FIG. 4 are well known, for example, identification methods, broadcast techniques and structures, authentication techniques, calling processes, cellular organizations and mobility managements all are well known. Therefore, such elements are not treated here in further detail. Detailed descriptions of such aspects of mobile telecommunications are provided in a book entitled, *Mobile Telecommunications Networking*, by Michael D. Gallagher and Randal A. Snyder, McGraw Hill, 1997, ISBN 0-07-063314-2, incorporated by reference herein. Particularly, the book treats techniques for interfacing a plurality mobile stations or instruments (through base stations) with a public switched telephone network. Generally as disclosed herein, the central stations C1–Cn can be related as base stations to function with the server S which, as stated above, may embody various wireless network structures.

To consider the system of FIG. 3 in greater detail, the telephone instrument TI1 (represented in a dashed-line block) shows representations of the earphone 20, the lamp 22, the microphone 28, the antenna 14, the switch box 30, the buzzer 45, and the power supply or battery pack 38, all as generally described above. Furthermore, as illustrated, the battery 38 (power supply) is connected to electronics package elements, specifically including: a transceiver 54 and a control unit 56. Also, the control unit 56 and the transceiver 54 are interconnected by a cable 58.

As indicated, the control unit 56 and the transceiver 54 are contained in the electronics package 40 (FIG. 2). The transceiver 54 may in part take a form somewhat similar to units well known in contemporary wireless telephone systems. Both digital data and audio signals may be transmitted by the transceiver 54; however, only audio signals (analog or digital, but essentially vocal) are received for the user and provided directly by the user.

The control unit 56 in the instrument TI includes a memory 56A (ROM) primarily for storing identification data for the instrument along with control data for the control unit 56. Generally, the functions of the control unit 56 (treated below) are relatively simple, involving the transmission of identification signals and sequencing the transmission and receipt of voice signals during interface operations.

As indicated above, the wireless telephone instruments TI1–TIn may utilize currently well-known wireless techniques for communication with the central stations C1–Cn. Communication is represented in FIG. 3 by wavy lines L1, L2 and Ln respectively. Such communication is to and from the antennas 14 of the instruments TI1–TIn through a central station antenna 60 to a wireless telephone platform 62. As suggested, the platform 62 incorporates substantial radio facility and may be capable of simultaneously accommodating both wireless and conventional communication, with multiple calls, involving multiple calling numbers from multiple terminals.

The platform 62 (described in greater detail below) is coupled to a processor and control unit 64 serving to process data and to control the operation of the central station C1. Functionally, the control unit 64 sequences the operation of components in the central station C1, as disclosed below to interface calls. Basically, after preliminary programming operations, it may control: screening and programming interfaces, treating messages and requests for location or emergency data, accommodating special routing commands, placing and receiving calls, regulating exchanges and generally controlling interfaces for receiving data, cuing callers, and accomplishing telephonic transactions.

To accomplish the control functions as well as, approval and routing operations of the central wireless station C1, the control unit 64 is coupled to: a voice generator 66 (ARU), a voice recognition unit 68, a memory 70, operator terminals 72 (collectively represented) and finally, a network switching unit 74 connected through the server S to the public switched telephone network N.

As indicated above, some components of the central station C1 are well known. Specifically, voice generators are well known as in forms of Automatic Response Units (ARUs) which may include some additional capabilities and are widely used to cue callers in telephonic interface systems.

Voice recognition units, as the unit 68, also are well known and have been developed to a attain a good level of reliably in identifying the spoken numerals "zero" through "nine" in an audio form, even when spoken by different persons and communicated by telephone. For example, voice recognition units providing an alternative to dual-tone multi-frequency (DTMF) signals are described in U.S. Pat. No. 5,509,060 issued Apr. 16, 1996 to Hall et al. In some embodiments hereof, the voice recognition unit 68 has the further capability to recognize voice signature words (including numbers) when spoken by a certain person.

The memory 70, in the central wireless station C1, involves a substantial capacity and includes a digital data section generally designated as 70A and an audio section generally designated as 70B. Specific data fields for the sections 70A1 and 70B1 are shown in FIG. 10. Note that the memory portions 70A1 and 70B1 are assigned to the instrument TI1, other portions serving other instruments.

In some situations, direct communication with a live operator may be desirable. To accommodate such operation, as described below, a user's call can be transferred to a live operator at one of the terminals 72 (FIG. 4). Generally, the operator terminals 72 include a display screen for advising the operator of an instant situation ("screen pop") to the extent of stored data.

The network switching unit 74 is a dial-up apparatus for operation with the server S to interface the network N. Accordingly, calls are placed or routed through the network N to a select one of the terminals S1 through Sn. The unit 74 operates with the control unit 64 and various forms thereof are well known.

In the disclosed embodiment, the following exemplary calling numbers may be used to access the platform 62 as described below to accomplish various communications or operations.

| Called Number | Source | Ultimate Function |
| --- | --- | --- |
| (213) 555 6251 | T1 | Call to custom program instrument operation |
| (213) 555 6262 | TI1 | Routine call, e.g. to the terminal S1 |
| (213) 555 9876 | TI1 or S1 | Call to increment pre-paid balance |
| 3333333333----- | TI1 | Connect to operator |
| 4444444444----- | TI1 | Call to learn TI1 backup data |
| "Home" | TI1 | Call home |
| (213) 555 1212 | S1 | Call to the terminal TI1 |
| (213) 555 9976 | S1 | For reporting location of the terminal TI1 |

To consider the structure of the platform 62 (FIG. 3) in greater detail, in FIG. 4, individual processes are represented by functional blocks. That is, individual blocks represent processors 78 (right) and 80 through 86 to accomplish various functions. In that regard, note that the operations attendant the functions can be variously allotted between the platform 62 (FIG. 3) and the unit 64. Also, it is noteworthy that allocation between individual units, locations and components may vary widely within systems embodying the present developments. However, the separate processors 78 and 80 through 86 (FIG. 5) are treated in an effort to effectively and simply illustrate a form hereof.

The various possible calls to the platform 62 (FIG. 3), as indicated above, are received on lines 77 (FIG. 4) and initially processed by a wireless coupler 76 (FIG. 4). Specifically, forms of called number identification, identify a desired process or program of operation. Thus, essentially, the wireless coupler 76 functions as a crossbar to access one of the individual lines 79 from one of the lines 77. While only a single line is shown extending from the coupler 76 to each of the functional blocks, it is to be understood that multiple lines are actually employed to accommodate and process many calls simultaneously. That is, numerous of the incoming ports or lines 77 can simultaneously access any of the lines 79 to accomplish processing as will now be considered.

Somewhat distinct from other calls, the initial call transaction from a telephone instrument TI may involve a called number, e.g. (213) 555 6251, as indicated in the above chart, or the initial call may be recognized automatically on initial energization of an instrument. In either event, the call is used to customize or program the instrument in accordance with the needs and desires of the owner or user. That process or series of process steps is performed by the custom programming interface or processor 78 connected between the coupler 76 and the unit 64 (FIG. 3). Note that each of the processors 80 through 85 (FIG. 4) also is connected, along with the interface 78 to the unit 64 (FIG. 3) through a common junction 87.

The custom interface 78 (FIG. 4) essentially may be a component of the platform 62 (FIG. 3) and operates during a programming interface with a caller, and with other elements of the central station C1 to store data (memory 70) for customizing the use of each instrument. Exemplary programming choices were listed above and some are treated in greater detail at a later point below. Note that the allocation of structure between the platform 62 (FIG. 3) and the unit 64 is a matter of design choice.

The processor 80 (FIG. 4, left) executes dial-up calls from the instruments TI. Basically, the processor 80 along with other central station components senses spoken numerals to provide dialing signals, e. g. DTMF or conventional digital signals to actuate the network switching unit 74 (FIG. 3) and accordingly attain the desired telephonic connection.

The processor 81 (FIG. 4) cooperates with other structure in the central unit C1 (FIG. 3) to increment the pre-paid balance for a designated instrument TI1–TIn. For example, when the number (213) 555 9876 is vocalized from the instrument TI1, a value incrementing interface is established involving other elements of the central station C1.

A spoken series of the numeral "3," e. g. "33333333 - - - " is detected by the processor 82 (FIG. 4) which acts with other structure in the central station to bridge the caller to one of the operator terminals 72 (FIG. 4). As shown, a detector 82A (FIG. 4) for the spoken word "three" provides a pulse to a digital counter 82B which overflows at a count of "eight", for example, to provide a command signal through the common junction 87 to the unit 64 commanding a bridge connection to one of the operator terminals 72.

The processor 83 (FIG. 4) is similar to the processor 82; however, it detects a series of spoken fours ("44444444 - -

-") to command the unit 64 to provide a back-up number for the instrument, or dial up and bridge a connection to a station for emergency use in association with the instrument TI1.

The processor 84 accommodates voice word dialing, that is, customizing an instrument for a specific word and/or word as spoken by a user. For example, word dial-up commands, as for the command word "home". The processor 84 may be programmed to detect a spoken word then operate with the unit 64 and drive the unit 74 to bridge or otherwise attain a desired connection. As indicated, numbers spoken may be customized to a user.

The processors 85 and 86 accommodate incoming calls for the instrument TI1 if programmed. The structures and related operations for the processors 85 and 86 are treated in greater detail at a later point, after considering outgoing calls from the instrument TI1.

In view of the above descriptions, to provide a complete understanding of the system and the related operating processes, an assumed operating sequence will now be explained. Accordingly, assume the instrument TI1 (FIG. 1) has been purchased and is to be placed in service. Although, as indicated the instrument may be variously programmed by a variety of different people, generally, for convenience reference will be to a "user." Other actual possibilities include, a parent programming the instrument TI for a child, an employer programming for an employee, a sales clerk programming for a foreign purchaser, and so on.

First, the user withdraws the antenna 14 (FIG. 2) actuating the switch device and sets the switch 13 to the "on" position thus placing the instrument in the "active" state CE.

In the active state CE, the control unit 56 (FIG. 3, left) fetches the instrument's identification data from the memory 56A then actuates the transceiver 54 to broadcast signals representative of the identification number (LR7438612-3TZ) or part thereof to initiate an interface. As a result, the central station C1 cues the instrument TI1. Specifically, as indicated by a block P4 (FIG. 5a), the central station transmits an introductory and instructional message to the instrument TI1. For example, the user might be advised: "Welcome - - - . To verify your instrument, please speak the activation number."

Figure 5A:
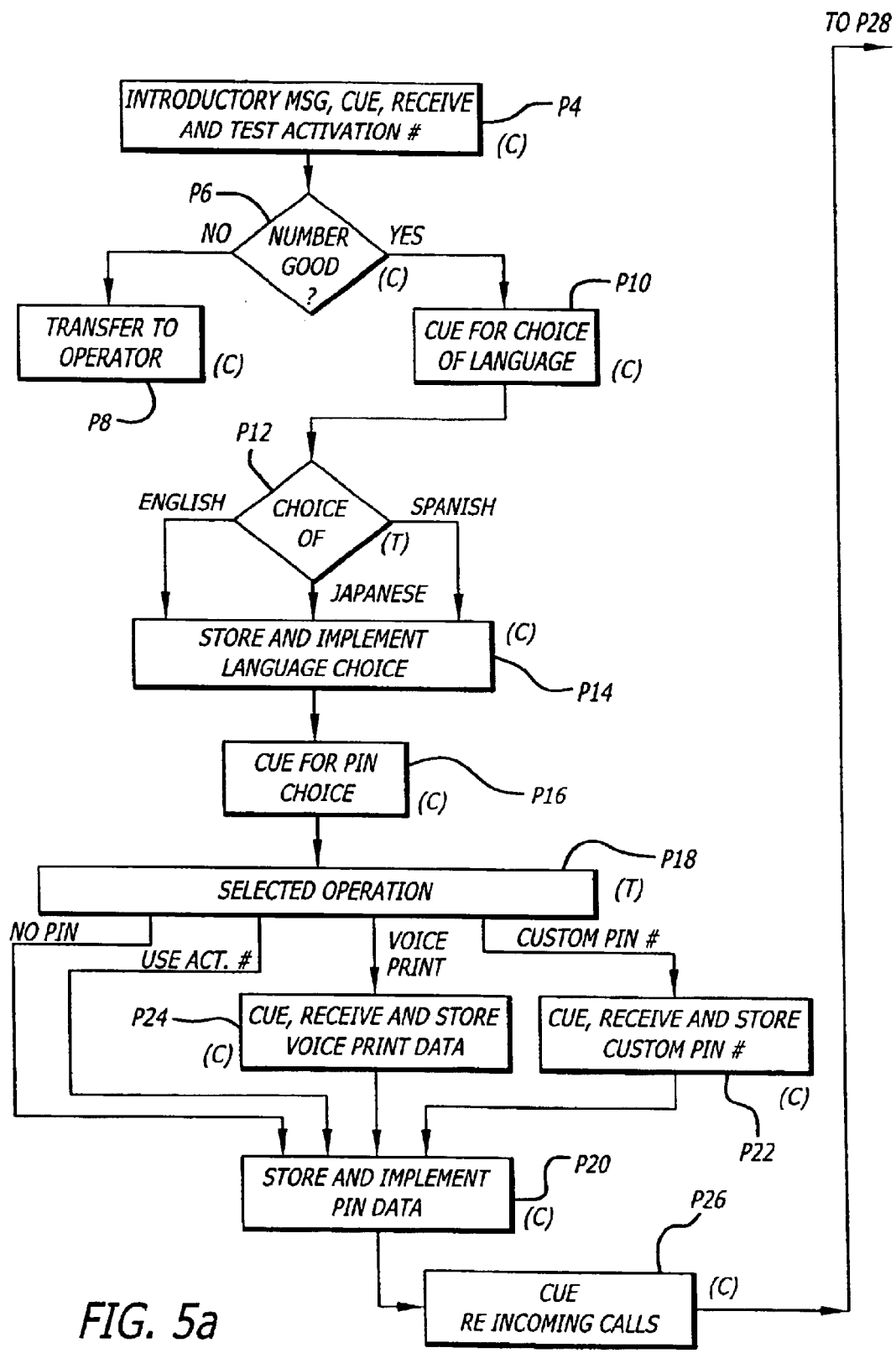
FIGS. 5a, 5b and 5c are flow diagrams illustrating operations of the system of FIG. 3.
Figure 5B:
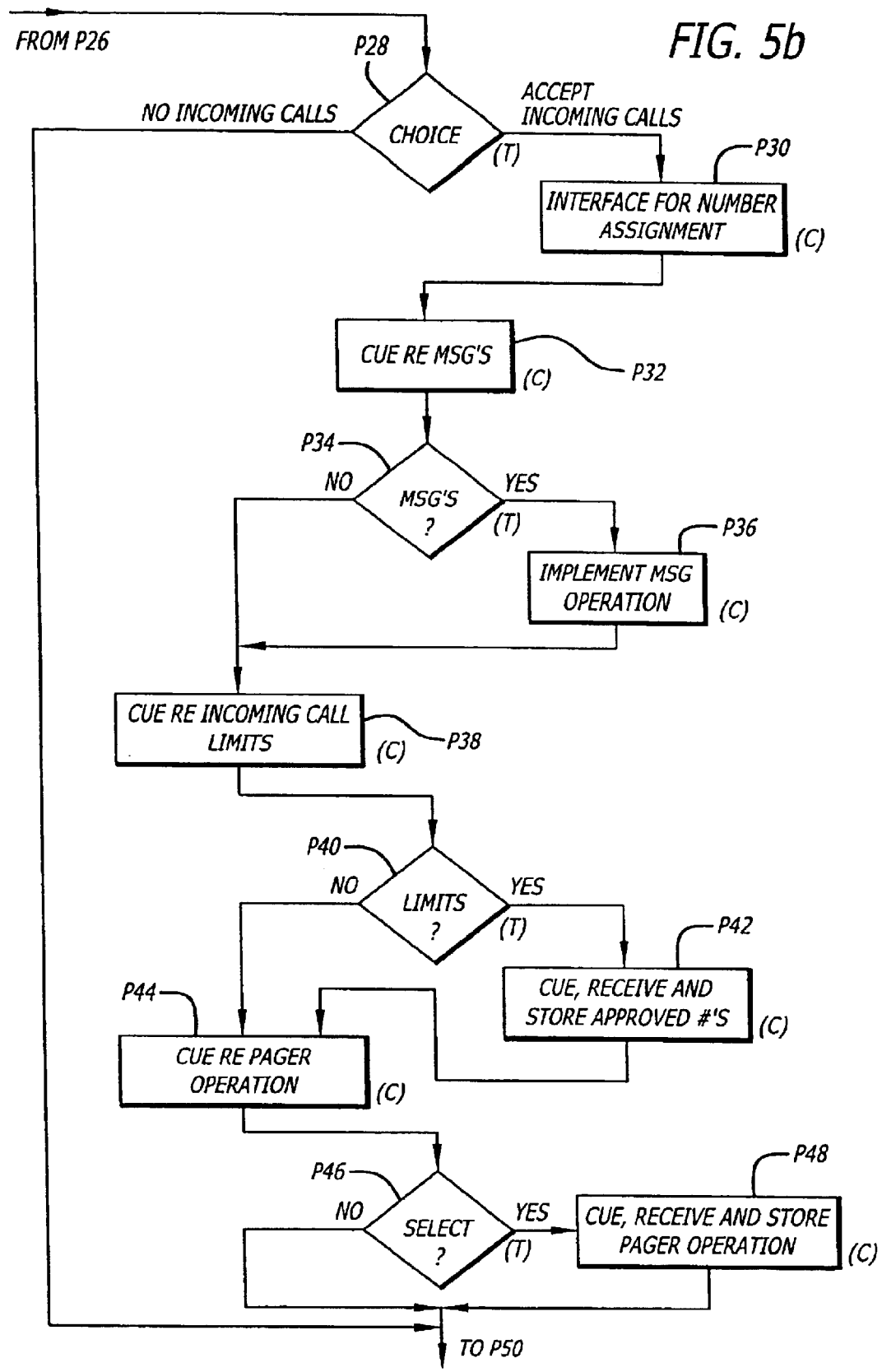

Normally the number (474632) would be spoken and tested as indicated by a query block P6. If the test is bad, or no number is received, the call is transferred by the unit 64 (FIG. 3) to an operator terminal 72. The step is represented in FIG. 5a by a block P8.

If the test is good, i.e., "yes," the process advances to the first step of programming the desired language and possibly voice. Incidentally, the initial verification will normally involve the language used where the instrument TI1 is sold.

To program the language choice, the user may be cued in stages or with several multiple choices. For example, the cue might involve the voice generator 66 (FIG. 4) controlled by the unit 64 and acting through the interface 78 (FIG. 4) to give an exemplary choice: "Please speak 'one' for English, 'two' for Spanish or 'three' for Japanese." The cuing operation is indicated in FIG. 5a by a block P10 and the choices are indicated by a query block P12.

Depending on the choice expressed by the user, a selection is confirmed and made as between: English, Spanish and Japanese. As a result, the choice is stored in the memory 70 (FIG. 4) and serves to provide all subsequent interfaces in the selected language. Essentially, all cues are stored in each of the available languages and are simply programmed selectively during the activation of each instrument TI. The step in the process of storing and implementing the selected language choice is represented by a block P14. Individual voice programming may be performed at this point or later.

With the language programmed, the interface may next continue with programming the PIN verification. In that regard, the user again is given several options, for example, by the following cue as indicated by the block P16. "Your telephone instrument can be variously operated with regard to fraud control. The choice is yours. For no fraud control, say '1'. To use the instrument activation number as a personal identification number, say '2'. To select a custom identification number, say '4'. To use your recognized voice for fraud control, say '5'."

The various choices are implemented by operations represented by a block P18 along with various secondary steps. If no personal identification number is programmed, the process simply stores that selection as indicated by a block P20 and proceeds.

If the user chooses to use the instrument activation number, e.g., "474632," that selection is stored and the process proceeds. See block P20.

Should the user wish an individual or personalized number, the steps of block P22 are implemented. Specifically, the user is cued for a desired PIN, which is received and stored for use in association with the instrument being programmed.

Finally, the anti-fraud selection may involve so-called "voice print" operation with the process cuing the user for several samples. The process is illustrated by the block P24 and involves cuing the caller, receiving samples, correlating such samples and defining a voice print for the user. Additional details of the process, the structure and the attendant operations are provided below. As stated above, instruments can be customized or programmed not only with regard to language, as explained, but as well with regard to voice. Such programming also may be performed at this stage, as part of the "voice print" operation, see block P24. Specifically, the ultimate user simply is cued to speak the numbers zero through nine which are voice printed for very reliable identification during future use of the instrument. As explained above, the user may select such operation if desired.

Summarizing, as a result of the above preliminary interface operations, the instrument may be programed, e.g. with respect to language, anti-fraud operation, and voice print operation. Essentially, the operating modes as selected are stored in the memory 70 (FIG. 3) for use each time the instrument TI is used.

Next, the system is programmed with regard to the treatment of incoming calls. The operation of each telephone instrument with respect to incoming calls can be variously programmed. For example, incoming calls simply may not be accepted. Alternatively, if incoming calls are accepted, other possibilities exist, for example, with respect to messages, limiting incoming calls and pager operation. Individual instruments may be produced or programmed to coordinate a user's desires. For example, telephone instruments without the capability for incoming calls might be sold to users who desire to so use an instrument. Of course, other possibilities exist in that regard; however, normally the operation for each instrument will be programmed in the central station, e.g., station C1.

To program the operation regarding incoming calls, a cue is provided to the user as indicated by a block P26. For example, the cue might state: "To receive incoming calls, say '1'. Otherwise, if you do not wish to receive incoming calls, say '2'."

Figure 6B:
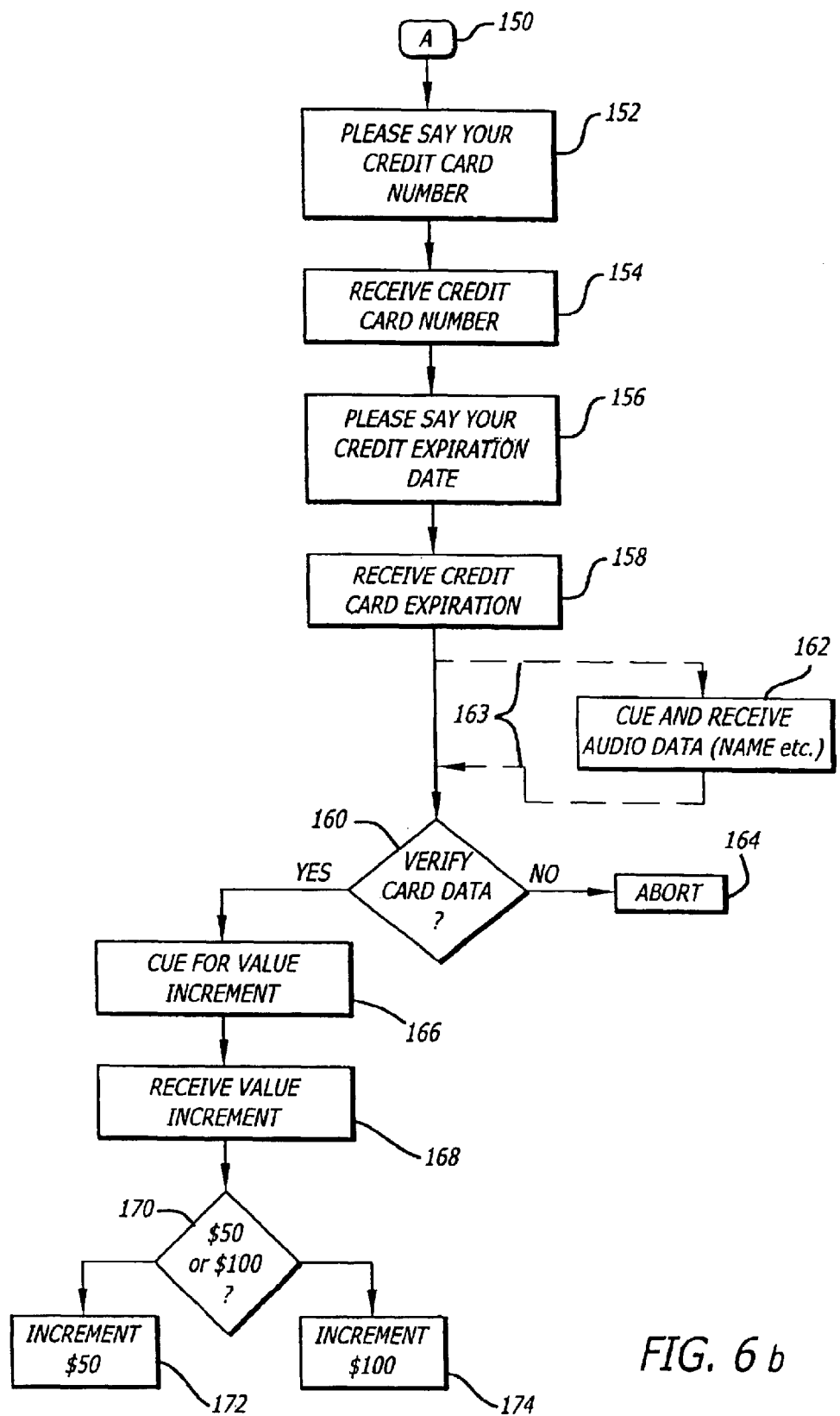

The choice between accepting or refusing incoming calls is represented by a query block P28 (FIG. 6b). If no incoming calls are to be taken, the process proceeds to an advanced step in the process. Otherwise, several programming operations are provided to accommodate incoming calls.

If incoming calls are to be taken, a telephone number must be assigned to the instrument TI1. The nature of the interface will be apparent, consequently, the operation is represented by a single block P30. Essentially, the user is simply cued to receive the calling number for the instrument TI1 then given the number and instructed to make a note of it. Of course, at the central station C1 (FIG. 4), the assigned number is entered from the processor 64 through the switching unit 74 and the server S into the public switched telephone network N. Various alternative techniques exist for entering the calling number in the network N, and in some instances may include action by one of the operator terminals 72.

With the accomplishment of a calling number for the instrument TI1, the process proceeds to program secondary aspects of receiving incoming calls. First, the user is cued regarding a choice of accepting or rejecting messages. The interface step is illustrated by a block P32, the choice being indicated by a query block P34. The cue may simply offer the choice indicating the spoken numbers to make an election. If messages are not to be taken, the process proceeds to the next programming step. Alternatively, if messages are to be taken, the memory 70 (FIG. 3) receives the appropriate programming data as indicated by a block P36. With the message program complete, the process proceeds to program limits for calls received. For example, a user may wish to take calls on the instrument TI1 from only a few persons. Consequently, numbers for such persons are stored as a basis for checking incoming calls. Considering the programming step in detail, the caller is cued regarding incoming calls as indicated by a block P38. The caller's choice is indicated by a query block P40. If no call limitations are imposed, the process proceeds to a subsequent operation. However, if the user wishes to limit incoming calls, programming operations are performed as indicated by a block P42. Specifically, the caller is cued for the acceptable calling numbers which are stored along with other programming data in the memory 70 (FIG. 3). With the acceptable calls programmed, the process proceeds to the next stage regarding pager operation, see block P44.

Essentially, the instrument TI1 may be provided with pager capability which can be either programmed for operation or remain dormant. In such an event, the user is cued for a choice as indicated by a query block P46. If pager operation is chosen, the requisite program operations are provided as indicated by a block P48. Essentially, the user is cued to provide the programming operation which is implemented by storage in the memory 70 (FIG. 3).

Figure 5C:
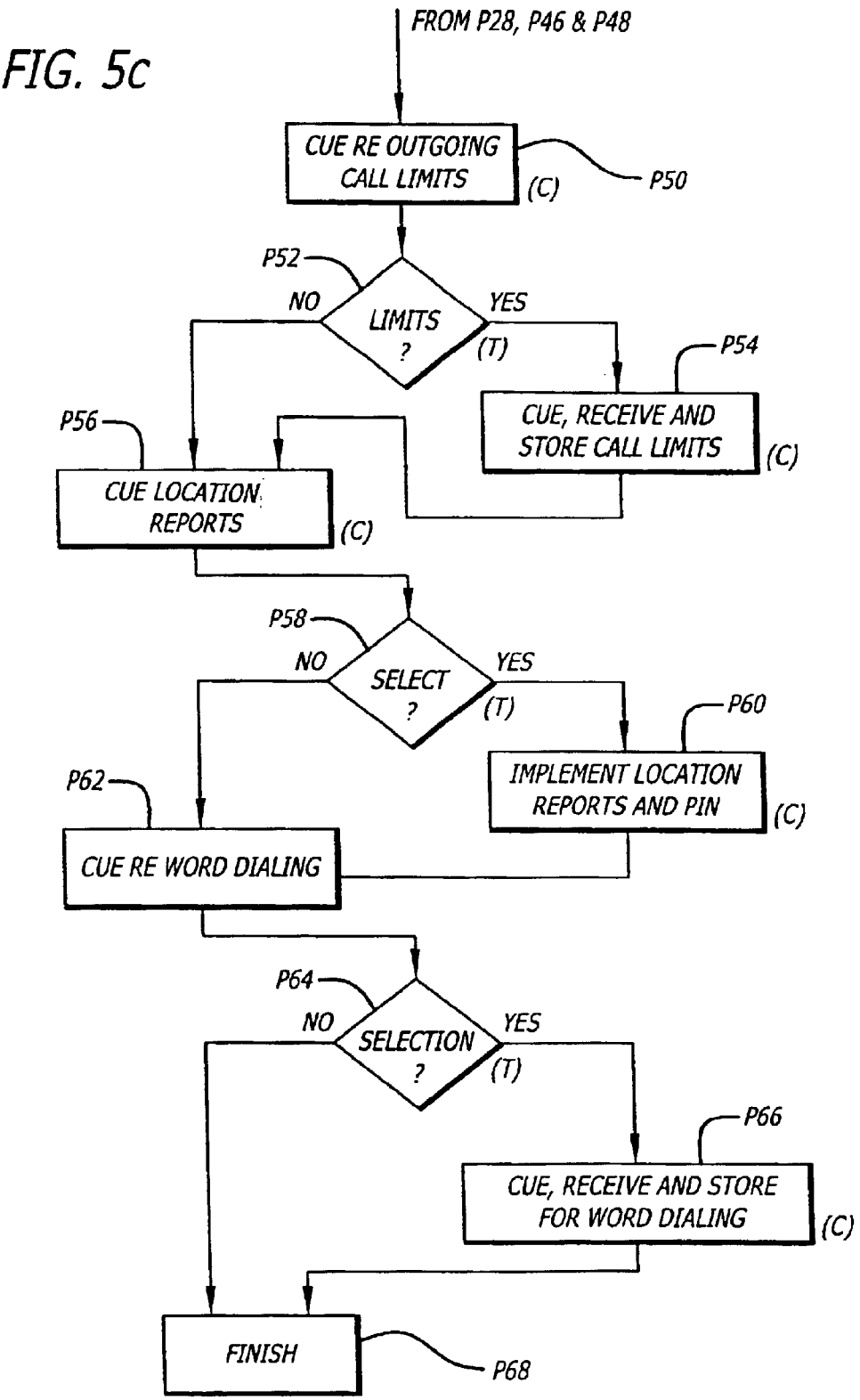

With the completion of the illustrative incoming call options, the system proceeds to a step of programming call limitations for outgoing calls, see block P50, FIG. 5c. Essentially, the instrument TI1 may be programmed for use only in limited areas (e.g., area codes) or during limited times. In view of the nature of the interface as described above, it will be apparent that the system simply cues the user regarding limits and if desired (query block P52), the details are cued and stored to accomplish the desired program of operation as indicated by a block P54.

After the programming of limitations, the process proceeds to a stage involving the availability of location reports on the use of the instrument TI1. Specifically, the user is cued as to whether or not location reports will be available as indicated by a block P56. This feature involves reporting locations of use for the instrument. As suggested, the feature may be useful for instruments assigned to children or employees. Note that in some situations programming may involve a combined effort of the actual user and the provider.

The choice of location reports for the instrument is illustrated by a query block P58. If location reports are not selected, the process proceeds to a subsequent; however, if selected, the availability is programmed as indicated by a block P60. Again, the operation may simply involve the user identifying specific calling telephone numbers which when identified as by automatic number identification (ANI) will be given use data on the instrument. Note that the information indicating use locations of the instrument is obtained from the central station C1 (FIG. 3) and not from the instrument TI. Consequently, this operation is separate and apart from the capability of the instrument TI to receive incoming calls.

With the instrument programmed regarding location tracking, the process proceeds to program word dialing as indicated by a block P62. After an appropriate cue, the user selects or rejects word dialing as indicated by a query block P64. If word dialing is selected, the requisite programming operations are accomplished as indicated by a block P66. Essentially, as explained above with respect to various programming operations, the user is cued to speak the desired called terminal words until a reliable profile is accomplished after which the requisite data is stored for accomplishing the operation. Consequently, a user may simply speak a word, for example "home," "office," or the like and attain the identified number.

With the completion of the word dialing phase, the exemplary programming is complete as indicated by a block P68. Of course, sequences of order may vary. A conclusionary message may indicate the unit is now ready for use.

In describing the operation of the programmed instrument TI1, the various programmable features generally are included in the description However, in accordance with the foregoing explanation, it is to be understood that such operating features may be deleted during the programming operation. Accordingly, it is to be understood that such features may be variously ordered and may be operative, or not, with respect to individual instruments.

At this point, outgoing calls are treated; incoming calls being treated at a later point. It is also noteworthy that many of the individual operating steps in the communication process disclosed herein are transparent to the user.

Assume that the programmed instrument TI1 (FIG. 3) is now to be used in association with the central station C1, specifically the wireless platform 62 which is shown in greater detail in FIG. 4. In order to indicate the origination location of each operational step in FIG. 6a (as between the instrument TI1 and the central station C1) the blocks and symbols in the flow diagrams are designated parenthetically either by a "T" (wireless telephone instrument TI1) or a "C" (central station C1).

With activation of the instrument TI1, an instrument identification signal is transmitted, see blocks 90 and 92 (FIG. 6a). At the central wireless station C1, the TI1 broadcast identification number is received by the wireless platform 62 (FIG. 3, center) through the antenna 60 and passed to the control unit 64. The operation is represented in FIG. 6a by a block 94.

On receiving the identification number data for the instrument TI1, the control unit 64 (FIG. 3) addresses a data cell 70A1 in the memory 70 storing digital data for the instrument TI1. Details of the memory 70A1 are treated below with reference to FIG. 9. The addressing step is indicated in FIG. 6a by a block 96. For the present, it is important simply to understand that the control unit 64 fetches reference information or data from the memory 70, e. g., memory cell 70A1, to accomplish the programmed operation for the instrument TI1.

Somewhat concurrently with the operation of obtaining the data, the central station C1 monitors the audio for the presence of a series of either "3"s, "4"s or a stored calling word, e.g., "home." As illustrated by a query block 99 (FIG. 6a), if any such audio representations are received, the system proceeds to bridge calls for treatment as explained above. The absence of such audio representations advances the process to verify the calling instrument TI1 based on the received instrument identification, as indicated by the block 98. Failure to confirm identification results in an abort operation (block 102). Otherwise, the process continues.

Various other authentications or verifications may be involved. As explained above, however, for the present example, the caller might be cued (block 100) or otherwise produces an audio PIN which is transmitted to the central station (block 104) to be received and processed (block 106) to enable another test (query block 108).

As indicated above, in accordance with another anti-fraud program, the spoken words for certain numerals, e.g., "seven", may be signaturized for identification and user verification. Consequently, the interface exchange regarding a code word or number is avoided. Rather, as indicated above, the user simply announces the number to be called, numeral-by-numeral and certain of the numerals are "signature" tested against a reference to verify the instrument and the caller. To illustrate the structure of such an operation, reference will now be made to FIG. 8.

Figure 8:
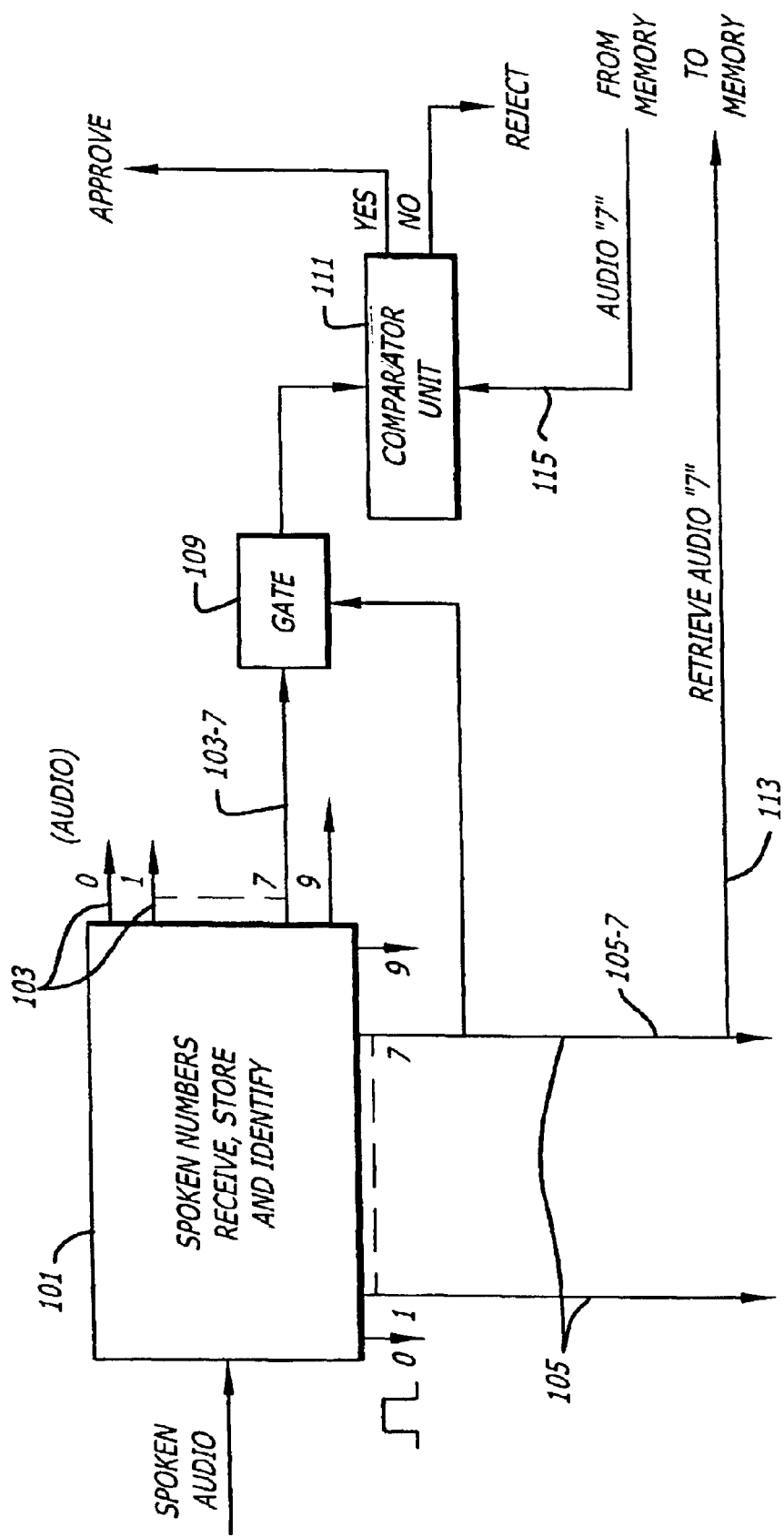
FIG. 8 is a block diagram of a component that may be employed in the system of FIG. 3.

Embodied in the central station C1 units 64 and 68, FIG. 4, is a capability illustrated in FIG. 8. Audio signals representative of numerals that are spoken into the instrument TI1 are received by a decoder 101 where they are stored and decoded. The decoder 101 provides refined audio representations of the received signals at lines 103 and binary representations for the presence of each of the numerals on a series of lines 105. DTMF representations also may be provided for dialing or control purposes, all as well known in the telephone art.

For purposes of explanation and drawing simplification, only structure for the numeral "seven" is shown and described in FIG. 8. Other numerals simply involve similar structure and operations. Accordingly, an audio signal for the spoken numeral "seven" appears in the line 103-7 and a binary indication appears on the line 105-7.

Note that the presence of a binary signal on one of the lines 105 indicates the presence of a specific spoken numeral, e. g., line 105-7 indicates the presence of the numeral "seven". Depending on the configuration of the system, certain numerals, e.g., "seven", are selected for signature testing. Generally, enough numerals must be used to statistically assure the likely presence of at least one signature numeral in any telephone number.

With the occurrence of the spoken numeral, e.g., "seven", a binary signal on the line 105-7 qualifies a gate 109 to pass the audio signal in the line 103-7 to a comparator unit 111 for correlation with a standard or reference. Thus, a fresh voice signature signal is provided for testing against a reference voice signature from memory.

The binary signal in the line 105-7 (line 113) fetches the reference "seven" signature signal from the memory 70 (FIG. 3) for comparison with the fresh signature signal just received for the numeral "seven". Specifically, the reference signature signal is provided from the memory 70 (FIG. 3) through a line 115 to the comparator unit 111. In the event of a coincidence or reasonable correlation, the call is approved as verified (FIG. 6a, block 108).

Otherwise, the call is rejected, as with and "abort" message as described (block 110, FIG. 6a).

If the call is verified as proper ("yes", block 108, FIG. 6a), the process advances to a step of block 112. Specifically the control unit 64 (FIG. 4) next determines whether the wireless telephone instrument TI1 has at least a critical pre-paid balance.

As an instrument TI is used, its credit balance is decremented to reflect the use. Facility also is provided for incrementing the credit balance by telephone. To perform the value-testing step, the control unit 64 (FIG. 3) again addresses the memory cell 70A1 for the instrument TI1 to obtain the current pre-paid credit balance or value held for the instrument (block 112). The step of the query block 114 (FIG. 7a) tests for a critical pre-paid balance, e. g. "balance over five dollars?". Note that although values are treated in terms of dollars herein, such values are merely exemplary, recognizing that points, credits, and so on could be used to designate value.

If the balance is low, ("no," block 114) the user might be cued: "Your instrument now has a value balance of only four dollars and fifty cents, if you would like to increase the value by using a credit card, please say 'one'." The prompt is represented by a block 116 and is resolved by the user's voice command, as illustrated by the query block 118. If the user wishes to increase the prepaid balance, the process advances to a sub-process as indicated by a block 120 (detailed below with reference to FIG. 6b). Otherwise, the process moves to another query block 122 representing another "test" step executed by the control unit 64 (FIG. 3). Specifically, the query is whether the instrument TI1 has sufficient current calling value to permit any call. If not, an abort is commanded as indicated by an abort block 124.

If the instrument has some significant value, i.e., an amount in excess of some minimum call value, the user again might be given the balance as the process moves from the query block 122 to the step of block 126, which step also follows a positive result from the test block 114 ("balance over five dollars?"). With the process advanced to the step of block 126, the user is cued for the called number (e.g., "1 213 555 6262" for terminal S1). Additionally, the user is given the current pre-paid value for the instrument An example of the dialog might be: "The present value for your instrument is sixty-four dollars and fifty cents, please speak the number you are calling, digit by digit."

At the instrument TI1, the user speaks the desired number to be called, e. g. "one, two, one, three, five, five, five, six, two, six, two." The spoken words impact the microphone 28 (FIG. 3) and are converted to audio signals that are broadcast by the transceiver 54 using the antenna 14. See FIG. 6a, block 128.

The transmitted signals representing the called number are received (FIG. 6A, block 130) at the wireless central station C1 (FIG. 3) by the platform 62. Applied to the control unit 64, the number signals are recognized and acknowledged, either digit by digit or in its entirety for confirmation, e.g., "Correct?". They are then converted (FIG. 6a, block 130) to a dialing form (e.g., DTMF) then applied to the network switching unit 74 (FIG. 3) to accomplish a dial-up operation through the server S and the public switched telephone network N (FIG. 6a, block 132).

Using the multitude of capabilities and structures of the public switched telephone network N, a connection is sought with the terminal S1. Normally, the user would hear a "ringing" tone and the connection would be established. It may be the policy that the call would be charged only if communication is established. Accordingly, a query block 134 (FIG. 6a) is illustrated. If the connection is not established, which might be determined by the user inactivating the instrument TI1, operation is aborted (block 135) with no action necessary.

If a connection is established (block 134, "yes"), the bridge between the instrument TI1 (FIG. 3) and the terminal S1 is completed with monitoring to determine charges for the call as indicated by the block 136. When the communication is terminated, the time and charges for the call are reflected in the prepaid balance as stored in the memory cell 70A1 for the instrument TI1. These operations are executed between the control unit 64 and the memory 70.

Thus, in summary, FIG. 6a illustratively describes the process that is cooperatively executed by the platform processor 80 (FIG. 4), the control unit 56 (FIG. 3), the units 66, 68, 70 and 74, all interfaced with the wireless telephone instrument TI1.

As indicated above, another operation in the outgoing mode involves incrementing the pre-paid balance. The operation may be initiated as a result of a specific call to a designated calling number, or when selected as an option as described above with reference to FIG. 6a (block 120). The logic will now be treated with reference to FIG. 6b.

Essentially, value is added to the prepaid balance of the telephone instrument TI1, by incrementing the value stored in the memory cell 70A1. For example increments of either fifty or one hundred dollars might be available. The selected increment of value is reflected in the balance stored at the central station C1 (home station for the instrument TI1) and may be supported by a conventional credit card. Limited data (credit card number and expiration date) may be sufficient to support the transaction. However, it is not uncommon to additionally require the card holder's name or other data. As disclosed below, such additional data may be communicated in the form of audio signals representing words spoken by the user. Essentially, with the processor 81 (FIG. 4), the control unit 64 (FIG. 3) records such audio information in the audio memory section 70B.

Considering the value-adding subprocess in detail, a block 150 (FIG. 6b, top) designated by an "A" indicates the start. The initial step (block 152) of the sub-process involves cuing the user to state the number of the credit card for supporting the increment of value. The number is spoken digit-by digit to be received, in audio form at the control station C1 in FIG. 3 (see block 154, FIG. 6B). As described above, the resulting audio signals may be converted to digital or other representations for storing or further processing. Comparison tests also may be performed as described above.

Next, the user is cued by the voice generator 66 (FIG. 3) to speak the card expiration date (FIG. 6b, block 156). Again, the date is spoken and received as audio signals then stored and processed as illustrated by a block 158.

Unless the process encompasses taking alphabetic word data, e. g. the user's "name", "address" and so on, the next step involves a query as indicated by the block 160. If alphabetic word data is to be taken, a block 162, indicates the alternative step as a dashed-line path 163, which involves cuing, receiving and distinctly recording or processing such data, again in the form of audio signals. The audio signals representative of alphabetic words and indicating credit data is stored in the memory section 70B and may involve subsequent processing, as by a person.

In any event, the process next advances to the query block 160, indicating a test executed by the control unit 64 (FIG. 3) to verify the received data. If the data is only digital, verification typically would be online. With verification, the transaction is approved. Otherwise, the process advances to a block 164 (FIG. 6b) indicating an abort of the communication.

Proceeding along the "yes" path from the query block 160, the next step is to cue the user for the value increment, e. g. "$50" or "$100"? The step is indicated by a block 166 and involves the user either speaking the digit "one" for a "$50" increment, or the digit "two" for an increment of "$100".

The spoken increment digit is received, as indicated by a block 168, converted to digital signals and depending on the selected option is processed by recording the increment. The operations are illustrated by a query block 170 and the alternate incrementing blocks 172 and 174 whereby value is added to the prepaid balance of instrument TI1. Thus, the final step is executed by the control unit 64 (FIG. 4) and the memory 70. Specifically, the memory cell 70A1 stores the incremented prepaid value of the instrument TI1.

The above explanations have primarily discussed exemplary outgoing calls from the instrument TI1. However, as indicated above, instruments may accommodate incoming calls if so programmed. When so programmed, incoming calls are taken when the instrument is in the "standby" state CC. Recall that in the "off" state CA no action occurs. In the "active" state CD, a call is in progress. If the instrument is programmed for such operations, in the "pager" state CB, conventional pager operation is scheduled.

When in use, the logic for incoming calls (state CC) is set forth in FIG. 7, and will now be treated in detail. The existence of an incoming call to the instrument TI1 is represented by a block 151. The call is received, as by the wireless platform 62 (FIG. 3) or the network switching unit 74 and passed to the unit 64. If such operation is programmed, wrong numbers and other unwanted calls are screened. Note that wrong numbers and other unwanted calls may be particularly annoying for wireless instruments.

A positive list of approved calling numbers is stored in the memory section 70A for the instrument TI1 as disclosed in detail below. Accordingly, the automatically provided telephone number (ANI) of the calling station is compared with approved numbers on a list in the memory cell 70A1 for the instrument TI1. The test or comparison is represented in FIG. 7 by a query block 159 and involves scanning the list of approved numbers for a match with the calling number (ANI).

If a match does not occur ("no" path from the block 159) there remains a possibility that the caller is approved, but is not calling from a home station. Consequently, the system prompts the caller (block 155) for an approved number. For example, the prompt might take the form: "If you are not calling from home, will you please state your home telephone number".

If the caller enters another number, it is tested as indicated by the query block 157, e. g., posing the query, "does the entered number coincide with any number on the approved list?" If not, the process proceeds to an abort operation as represented by the block 159A. Typically a message would be given, for example: "The number you have called is not accessible to you at this time. Thank you."

If the calling number is approved, as a result of either of the steps illustrated by the query blocks 152 or 157, the operation proceeds to determine whether the instrument TI1 is in a "standby" state, i. e., state CC. The determination is represented by a query block 161 in FIG. 7.

When the instrument TI1 is in a standby state CC, ("yes") the buzzer signal 45 (FIG. 3) is actuated providing an audible sound to signal the call. Of course, the possessor of the instrument TI1 may or may not "pick-up" (query block 165) by turning on the switch 13 (FIG. 1). If the call is taken ("yes" from the block 165) the instrument is placed in an "active" state CD and the call is bridged from the central station C1 (FIG. 3) as indicated by the block 167.

If the call is not taken (switch 13 not turned "on"), or if the instrument TI1 is not in a "standby" state ("no" from block 161) the operation proceeds to a block 169 initiating a process for taking messages if programmed. As illustrated, the central station C1 cues the caller with a query, e. g., "Your call can not be connected at present, if you wish to leave a message please touch '1', otherwise, hang up" (block 169).

The process then proceeds to a query block 171 for the determination of whether the caller wishes to leave a message. If a message is not to be left, the process is ended as indicated by the block 179.

If the caller desires to leave a message, there is a prompt as indicated by the block 173, e. g., "Please begin your message now and touch the pound sign key when finished, then hang up."

The audio message is captured in the memory section 70B1 using conventional recording techniques as indicated by the block 175. Also the message flag is set in the memory section 70A1 as indicated by the block 177. Thereafter, anytime the instrument TI1 is set in a "standby" state CC, the buzzer 45 in the instrument TI1 will be actuated indicating a stored message.

The process for delivering messages is also diagrammed in FIG. 7 and will now be considered beginning at the indicated location "to receive" (FIG. 7, center right). The system monitors for the existence of a flag for the instrument TI1, continually poising the query, "is the flag set" as indicated by a query block 180. If the flag is not set, the logic is inactive (terminate block 182). However, when a flag is set, the process monitors the instrument for an entry into the "standby" state CC, as indicated by the block 184. If that state does not occur (query block 186) the monitoring simply continues. However, with the occurrence of the "standby" state, as indicated by a "yes" from the query block 186, the instrument TI1 sounds the buzzer signal 45 (block 187) to alert the holder, then proceeds to the next test, as represented by a query block 188.

The next query is: whether the holder of the instrument TI1 "picks up," i.e., switches to the "active" state CD. If so, the message is given (block 190) and the flag is cleared. Note, that the system also may be implemented to enable the holder to override the message. If there is no "pick-up", after a reasonable delay (block 192) the system returns to the monitoring operation of block 184.

As indicated above, signal messages also may be provided in accordance with a pager operation when the instrument is in the "pager" state C2. Essentially, in that state, a holder of the instrument is simply signaled to call for a message. Depending on the policy adopted for operating systems, charges may be levied for incoming calls. Specifically, the prepaid balance for an instrument may be decremented to account for incoming calls. A wide range of possibilities exist in that regard. For example, incoming calls might simply be charged against the existing prepaid balance, with or without a conditional test of sufficient balance value. In that regard, a "cut off" level in the prepaid balance may be invoked for simplifying the operation. Also, different charges may be applied for different treatments of incoming calls. Thus, various possibilities can be accommodated.

In accordance with another feature of the system, if programmed, the geographic location of the instrument TI1 can be tracked by an authorized person using a proper telephone or being able to identify a proper telephone dialing number. Essentially, when the instrument TI1 communicates directly or indirectly with a central station, e. g., the central station C1, a record is made in the memory 70 of the instrument's geographic location. For example, the memory might maintain a record of the last five use locations of the instrument. An approved caller may then call the central station C1, e. g., using the number "(213) 555 9976" as indicated above, to access the processor 86 (FIG. 4) in the platform 62 (FIG. 3) for a location report. Approved callers may be identified by automatic number identification (ANI) or the like, and by personal identification numbers if desired. With proper identification, a caller is provided a location report by correlating the location data from individual central stations C1–Cn to the extent available. As an alternative, tracking calls may be limited to charge made calls, e.g., by using a "900" calling number.

The location tracking feature is desirable for a variety of applications. For example, it may be important to track the locations of an instrument used by a child. Also, a central office may wish to track the locations of traveling personnel with respect to their use of a wireless telephone instrument. In that regard, location data in the memory 70A is simply converted to audio signal representations by the unit 64 (FIG. 3) which drives the voice generator 66 to announce the location information.

Repeatedly, reference has been made to the memory 70 (FIG. 3) in relation to various operations. As indicated, individual memory portions are provided for each of the wireless instruments TI1–TIn. Depending on system design, regulatory provisions and operating formats, the contents of the memory 70 may vary to a considerable extent. Regarding the audio memory 70B, typically, digital recording also will be utilized. However, in that regard, messages and the like are simply recorded and utilized in accordance with well known techniques of the art. As indicated, flags and designations may be used. In any event, an exemplary format for an instrument memory section is treated below and may typify each of the sections for the individual instruments TI1–TIn.

Figure 9:
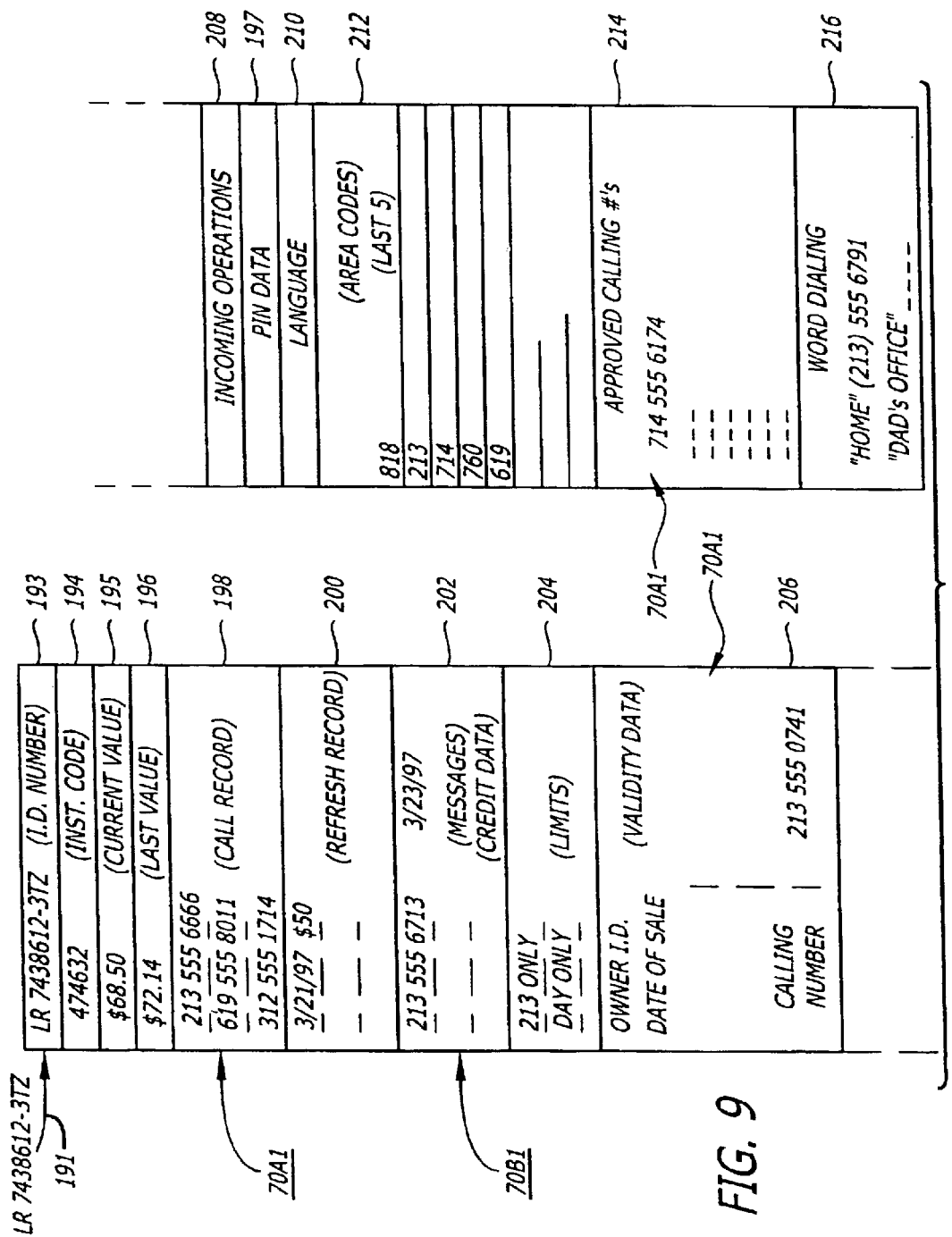
FIG. 9 is a symbolic diagram of a memory cell in the system of FIG. 3, for representing data on a wireless telephone instrument in accordance herewith.

FIG. 9 illustrates an exemplary memory format for the instrument TI1. As indicated above, stored data includes an identification number, for example, "LR7438612-3TZ" for the instrument TI1. As instruments in accordance herewith may be treated somewhat differently in various systems, it is to be recognized that the indicated number is merely illustrative, and conventions, regulations and so on may command identification numbers or data in totally different forms in view of considerations as set forth in the above-referenced book, *Mobile Telecommunications Networking*. Again, a detailed treatment of identification numbers for mobile instruments or stations is provided in that book, specifically in a section beginning on page 64.

Recapitulating briefly, with activation of the instrument TI1, its identification number is transmitted (broadcast) from the instrument TI1. On receipt at the central station, e. g., central station C1, the number is used by the processor and control unit 64 to address the memory section 70 and accordingly locate specific memory portions, e. g., portion 70A1 and 70B1 for the instrument TI1. Thus, memory portions are addressed individually by the identification numbers as illustratively represented by an arrow 191 in FIG. 9 (upper left).

The exemplary memory cell or portion 70A1 includes a number of individual fields shown horizontally arranged in FIG. 9 containing data including operational data for controlling interface operations with the instrument TI1 as programmed from that instrument. At the top of the section 70A1, a field 193 stores the identification number ("LR7438612-3TZ) for confirmation of the instrument.

Next in order as shown, a field 194 registers the instrument activation code, e. g., "474632". Depending on the programming, the field 194 may continue to be used for anti-fraud control. Alternatively, the field 197 (right) may store data to verify a user as explained above.

A pair of related fields 195 and 196 respectively store the current and last prior prepaid values of the instrument TI1. The current value, e. g., $68.50 is used for authorizing use and is reported to the user. The prior value is accessible to an operator, as by "screen pop" techniques, or selective addressing, along with all fields of the section for reference purposes, as at one of the operator terminals 72 (FIG. 4).

A series of similar fields 198 (FIG. 9) are collectively identified and store a record of the calls made by the instrument TI1. The fields 198 may be organized as a transient memory for some predetermined number of calls that were made most recently. For example, only the last twenty calls might be stored. Designation or target telephone numbers are illustrated for the three last calls made from the instrument TI1. Dates also may be recorded as a record for operator use.

Another series of similar fields 200 also is collectively represented and provides a record of refreshed value increments. Specifically, incremental values and dates for adding value to the prepaid balance are stored as shown. Again, the storage may be transient covering some predetermined number of prior occasions, again for operator use.

As previously suggested, the system can receive and report messages via the instrument TI1. Messages, in the form a telephone calling number and a date, are stored in a group of memory fields in the section 70B1 collectively designated as fields 202. Alternatively, these fields may be flags correlated to audio data stored separately. Audio credit data, e.g., name and so on, also is stored in the field 202.

The next field 204 relates to limitations imposed on outgoing calls. Accordingly, this feature involves limitations that may be imposed individually on each instrument TI, for example on the use of the wireless telephone instrument TI1. Some examples will explain the feature and its operation.

One potentially widespread use of instruments in accordance herewith is by young students as in elementary school. With the defined risk of loss, the convenient physical form of instruments hereof, and the simple operation, parents may wish to provide instruments to their children both for security and routine communication. To further limit the risk attendant such instruments, use limitations can be imposed.

Pursuing the example of a young student as the user, it might be expected that proper use of the instrument TI1 would be restricted to a single destination dialing area, e.g., "213." Accordingly, the use of the instrument can be so limited by storing the area code or codes that are approved for calls. Such limitations are stored in a group of fields 204 (FIG. 9) and are employed to test outgoing calls for the instrument. Such tests may be executed similarly to other outgoing tests as explained above. For example, the flow diagram of FIG. 6, would be modified simply by incorporating a further verification step similar to that of the block 108 (FIG. 6). Thus a test or tests would be performed by the processor and control unit 64 (FIG. 3) as a part of the step represented by block 130 ("receive and process call number"). The test would check the called number (or other limitation data, as time) against the reference area code numbers (or other control data) stored in the fields 204 (FIG. 9).

As suggested, another limitation may be based on the time of day when calls can be made. For example, the day (twenty four hours) might be divided into four segments of six hours each called: "morning", "day", "evening" and "night". The instruments TI may then be restricted individually for use to any one or more of the segments. For example, an employee given the instrument TI1 might be restricted to using it only during the segments designated "morning" and "day". The approved six-hour segments are stored in the fields 204 and are imposed by verification processing in the control unit 64 (FIG. 3). For example, such a time verification may be a part of the test process, step 108 (FIG. 6).

Generally, attempted use of the telephone instrument TI1 that is outside the imposed limitations will be aborted in favor of a brief denial message. Thus, the risk of loss from clones, lost or misused instruments is further reduced.

Returning to consideration of the memory section 70A1 (FIG. 9) a group of fields 206 store various personal and statistical data on the assigned owner or user. Again, such information is available to be displayed to an operator. Often such data will be useful in communicating with users, as in the cases of interrupts or abort situations. Emergency data also may be included, as for example, the home telephone number of a young person or that of a specific medical facility.

A group of fields 208 store the programmed instructions regarding incoming calls. As indicated, the instrument TI1 can be variously custom programmed, as for example, to reject all incoming calls, selectively accept incoming calls, take messages and so on.

As explained above, one programmable feature is the interface language, e.g., English, Spanish or Japanese. The selected language data for the program is contained in the fields 210.

A group of fields 212 store area codes or other call-number geographical indications of communications by the instrument TI1. The data is processed to provide location reports as explained in detail above. A related set of fields 214 identify calling stations that are approved for receiving location reports. Thus, as illustrated, the terminal S1 (FIG. 3) can be ANI identified with a calling number of (714) 555 6174 and be authorized to call for a location report. As indicated above, a personal identification number also may be required and such calls may be limited to a "900" call number.

A group of fields 216 correlate spoken signature words from the instrument TI1 to a specific terminal to be called. As illustrated, for the customized instrument TI1, the spoken word "home" is identified to locate the number (213) 555 6791 which is the home number for the assigned user of the instrument TI1. Basically, a decoded number representation of the word "home" is stored to locate the number to be called or dialed up. Consequently, when the word "home" is spoken to the instrument TI1, it is processed to retrieve the desired number from one of the fields 216. The retrieved number then is dialed and a connection is bridged, as by the network switching unit 74 (FIG. 3). Voice signatures also may be stored.

In view of the detailed descriptions set out above, the structure and operation of the system to be custom programmed and execute effective communication processes will be apparent. However, a few additional comments may be appropriate in relation to various applications of the system. The case of a young student was considered above and is here emphasized in the interests of security and communication. Telephones are often unavailable when most needed and in the case of young people, the need may be extreme.

The same features that render an instrument hereof to be suitable for a young person also are present for numerous other applications. Specifically, reduced risk of loss, minor complications of ownership, customized operation and considerable convenience for storage render such instruments practical for travelers, automotive use, employee assignment, pager users, and a host of others. The convenience and utility of systems hereof afforded foreign visitors is also particularly noteworthy. Programmed with a visitor's language and customized for individual use, a unit also may be a source of information, translation or directions, as from an operator terminal. The cost of a base unit, programmed for outgoing calls only, and for a foreign language interface could be very small in relation to the service that is available.

Instruments carried in automobiles also could add considerable safety and convenience in relation to the cost. Additionally, as explained, traveling employees could well be provided instruments by employers. In general, distribution locations could be virtually anywhere, for example, airport shops, convenience stores and so on.

In view of the above explanations of exemplary systems, processes and features, it will be apparent that other embodiments and processes may be employed utilizing the developments hereof as in relation to instruments, wireless equipment, storage and programming. Accordingly, the proper scope hereof is deemed appropriately determined on the basis of the claims as set forth below.

What is claimed is:

1. A wireless telephone system for communicating with remote telephone terminals through a public switched telephone network, comprising:
   a plurality of mobile keyless telephone instruments;
   at least one central station for communication with the mobile keyless telephone instruments to interface the mobile keyless telephone instruments with the public switched telephone network for communication with remote telephone terminals, the central station including:
      a voice generator for providing voice cues to individual mobile keyless telephone instruments;
      a speech recognition unit for receiving spoken number signals from the mobile keyless telephone instruments and converting the spoken number signals into program signals and dial-up signals for actuating the public switched telephone network to attain communication with remote telephone terminals;
      a control unit for driving the voice generator and the speech recognition unit in accordance with stored program signals to cue for spoken number signals from the keyless telephone instruments to provide dial-up signals for attaining communication with remote telephone terminals and while in programming communication with an individual mobile keyless telephone instrument to convert the spoken number signals to provide program signals for individual operation of the central station in communicating with the individual mobile keyless telephone instrument; and
      a memory for storing the program signals for individual mobile keyless telephone instruments, including program signals directed to the individual programs for the operation of the central station in communicating with the individual mobile keyless telephone instruments.

2. A system according to claim 1 wherein the stored control signals directed to the individual programs includes acceptance of incoming call control signals.

3. A system according to claim 1 wherein the stored control signals directed to the individual programs includes rejection of incoming call control signals.

4. A system according to claim 1 wherein the stored control signals directed to the individual programs includes location tracking control signals.

5. A system according to claim 1 wherein the stored control signals directed to the individual programs includes voice translation control signals.

6. A system according to claim 1 wherein the stored control signals directed to the individual programs includes keyword dialing control signals.

7. A system according to claim 1 wherein the stored control signals directed to the individual programs includes time limitation control signals.

8. A system according to claim 1 wherein the stored control signals directed to the individual programs includes area limitation control signals.

9. A system according to claim 1 wherein the stored control signals directed to the individual programs includes use limitation control signals.

10. A system according to claim 1 wherein the stored control signals directed to the individual programs includes word dialing control signals.

11. A system according to claim 1 wherein the stored control signals directed to the individual programs includes anti-fraud control signals.

12. A system according to claim 1 wherein the stored control signals directed to the individual programs includes message control signals.

13. A system according to claim 1 wherein the stored control signals directed to the individual programs includes language data.

14. A system according to claim 1 wherein the stored control signals directed to the individual programs includes voice data.

15. A system for accommodating a plurality of keyless mobile telephone instruments, to communicate with remote telephone terminals through a public switched telephone network, comprising:
   a mobile wireless telephone platform for interfacing the keyless mobile telephone instruments;
   a memory for storing cues to be transmitted to the keyless mobile telephone instruments to prompt for operating instructions for individual keyless mobile telephone instruments and for storing audio signals representative of spoken-word operating instruction signals from individual keyless mobile telephone instruments;
   a speech recognition unit for converting audio signals to number signals in the forms of programming signals and dial-up signals; and a control unit operative during programming operations of a keyless mobile telephone instrument: to selectively actuate the platform to transmit programming cue signals from the memory to keyless mobile telephone instruments and to receive resulting audio program signals, to actuate the speech recognition unit to convert audio program signals to number programming signals, to actuate the memory to store the number programming signals as operating instructions, and operative during dial-up operations of a keyless mobile telephone instrument to selectively actuate the platform to receive audio dial-up signals from the keyless mobile telephone instrument, to actuate the speech recognition unit to convert audio dial-up signals to number dialing signals and to bridge the keyless mobile telephone instrument to a remote terminal in accordance with the number dialing signals.

16. A system according to claim 15 wherein the number programming signals include number programming signals relating to acceptance of incoming call control data.

17. A system according to claim 15 wherein the number programming signals include number programming signals relating to rejection of incoming call control data.

18. A system according to claim 15 wherein the number programming signals include number programming signals relating to keyword dialing control data.

19. A system according to claim 15 wherein the number programming signals include number programming signals relating to time limitation control data.

20. A system according to claim 15 wherein the number programming signals include number programming signals relating to area limitation control data.

21. A system according to claim 15 wherein the number programming signals include number programming signals relating to word dialing control data.

22. A system according to claim 15 wherein the number programming signals include number programming signals relating to translation control data.

23. A system according to claim 15 wherein the number programming signals include number programming signals relating to anti-fraud control data.

24. A system according to claim 15 wherein the number programming signals include number programming signals relating to location tracking control data.

25. A system according to claim 15 wherein the number programming signals include number programming signals relating to limitation control data.

26. A system according to claim 15 wherein the number programming signals include number programming signals relating to message control data.

27. A system according to claim 15 wherein the number programming signals include number programming signals relating to language data.

28. A system according to claim 15 wherein the number programming signals include number programming signals relating to voice data.

29. A process for interfacing a plurality of keyless mobile telephone instruments to accommodate telephonic transactions, as communication with remote telephone terminals through the public switched telephone network, including the steps of:

receiving identification signals from a keyless mobile telephone instrument on preliminary use thereof to initiate at least one programming operation for a keyless mobile telephone instrument;

prompting the keyless mobile telephone instrument for programming data relating to operating instructions for the use of the keyless mobile telephone instrument;

receiving voice word programming data from the keyless mobile telephone instrument;

storing the voice word programming data for controlling the operation of the keyless mobile telephone instrument;

receiving identification signals from a keyless mobile telephone instrument on dial-up use thereof to initiate a telephonic transaction;

receiving voice word transaction data from the keyless mobile telephone instrument to accomplish a telephonic transaction in accordance with the stored programming for the keyless mobile telephone instrument.

30. A process according to claim 29 wherein the voice programming data relates to acceptance of incoming call control data.

31. A process according to claim 29 wherein the voice programming data relates to rejection of incoming call control data.

32. A process according to claim 29 wherein the voice programming data relates to keyword dialing control data.

33. A process according to claim 29 wherein the voice programming data relates to location tracking control data.

34. A process according to claim 29 wherein the voice programming data relates to time limitation control data.

35. A process according to claim 29 wherein the voice programming data relates to area limitation control data.

36. A process according to claim 29 wherein the voice programming data relates to word dialing control data.

37. A process according to claim 29 wherein the voice programming data relates to translation control data.

38. A process according to claim 29 wherein the voice programming data relates to limitation control data.

39. A process according to claim 29 wherein the voice programming data relates to anti-fraud control data.

40. A process according to claim 29 wherein the voice programming data relates to message control data.

41. A process according to claim 29 wherein the voice programming data relates to voice data.

* * * * *